(12) United States Patent (10) Patent No.: US 9,094,416 B2
Magharei et al. (45) Date of Patent: Jul. 28, 2015

(54) CONTRIBUTION AWARE PEER-TO-PEER LIVE STREAMING SERVICE

(75) Inventors: Nazanin Magharei, Eugene, OR (US); Yang Guo, Plainsboro, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 881 days.

(21) Appl. No.: 12/312,621

(22) PCT Filed: Mar. 23, 2007

(86) PCT No.: PCT/US2007/007220
§ 371 (c)(1),
(2), (4) Date: May 19, 2009

(87) PCT Pub. No.: WO2008/066560
PCT Pub. Date: Jun. 5, 2008

(65) Prior Publication Data
US 2010/0064049 A1 Mar. 11, 2010

(51) Int. Cl.
*G06F 15/16* (2006.01)
*H04L 29/08* (2006.01)

(52) U.S. Cl.
CPC .................................. *H04L 67/104* (2013.01)

(58) Field of Classification Search
CPC ..................................................... H04L 67/104
USPC .................................................. 709/226, 229
See application file for complete search history.

(56) References Cited

U.S. PATENT DOCUMENTS

| | | | |
|---|---|---|---|
| 5,859,959 A | 1/1999 | Kimball et al. | |
| 6,601,101 B1 | 7/2003 | Lee et al. | |
| 7,454,480 B2 * | 11/2008 | Labio et al. | 709/217 |
| 7,558,797 B2 | 7/2009 | Li | |
| 7,593,333 B2 | 9/2009 | Li et al. | |

(Continued)

FOREIGN PATENT DOCUMENTS

JP 2007502560 2/2007

OTHER PUBLICATIONS

Dow et al.: "A Reliable Multicast Routing Protocol Based on Recovery Points in Mobile AD-HOC Networks," 2005 2A$^{nd}$ Int'l. Conference on Mobile Technology, Applications and Systems, Nov. 15-17, 2005, pp. 1-7.
Magharei et al.: "Understanding Mesh-based Peer-To-Peer Streaming," Proceedings of the International Workshop on Network and Operating Systems Support for Digital Audio and Video, May 2006, New Port, Rhode Island, XP002444978.
Mueller et al.: "Analysis of a distributed algorithm to determine multiple routes with path diversity in AD Hoc Networks," Modeling and Optimization in Mobile, AD Hoc, and Wireless Networks, WIOPT 2005, 3rd Int'l. Symposium, Apr. 3-7, 2005, pp. 277-285.

(Continued)

*Primary Examiner* — Douglas Blair
(74) *Attorney, Agent, or Firm* — Robert D. Shedd; Jerome G. Schaefer

(57) ABSTRACT

A method of admitting a joining contribution-aware peer to a peer-to-peer network is described including receiving a plurality of system parameters at the joining peer, the plurality of system parameters further including a system resource index and determining an entitled incoming degree value for the joining peer, the determined entitled incoming degree reflecting a value of the system resource index. Also described is a bootstrap node for a contribution-aware peer-to-peer network including a processor device and a network interface device coupled to the processor device, the network interface device being adapted to be coupled to a communication network, the processor device being adapted to receive a request for potential parent peer identification information from the communication network through the network interface device and whereas the processor device is adapted to respond with a plurality of device identification values and a system parameter.

8 Claims, 48 Drawing Sheets

(56) References Cited

U.S. PATENT DOCUMENTS

| | | | |
|---|---|---|---|
| 7,613,770 | B2 | 11/2009 | Li |
| 7,616,582 | B2 | 11/2009 | Jeffery et al. |
| 7,664,109 | B2 | 2/2010 | Li |
| 7,729,376 | B2 | 6/2010 | Klausberger et al. |
| 7,729,992 | B2 * | 6/2010 | Rose ............................. 705/51 |
| 7,809,646 | B2 * | 10/2010 | Rose ............................. 705/51 |
| 8,078,708 | B1 * | 12/2011 | Wang et al. .................... 709/223 |
| 8,341,257 | B1 * | 12/2012 | Wang et al. .................... 709/223 |
| 8,532,611 | B2 | 9/2013 | Kotzin |
| 2003/0135784 | A1 | 7/2003 | Yamaguchi et al. |
| 2004/0143672 | A1 | 7/2004 | Padmanabham et al. |
| 2004/0193705 | A1 | 9/2004 | To et al. |
| 2004/0203385 | A1 | 10/2004 | Narayanan et al. |
| 2005/0273511 | A1 * | 12/2005 | Ferreira de Andrade et al. ............................. 709/227 |
| 2007/0026857 | A1 | 2/2007 | Kotzin |
| 2007/0091809 | A1 * | 4/2007 | Smith ............................ 370/235 |
| 2008/0140853 | A1 * | 6/2008 | Harrison ....................... 709/231 |
| 2010/0011103 | A1 | 1/2010 | Luzzatti et al. |
| 2011/0202679 | A1 | 8/2011 | Cohen et al. |
| 2013/0303223 | A1 * | 11/2013 | Patil et al. ..................... 455/517 |
| 2014/0012991 | A1 * | 1/2014 | Wang et al. .................... 709/226 |

OTHER PUBLICATIONS

Sung et al.: "Enabling Contribution Awareness in an Overlay Broadcasting System," SIGCOMM 2006 Proceedings, Sep. 14, 2006, pp. 411-422, XP002444977.

International Search Report, dated Aug. 13, 2007.

Shimizu et al., "Design of Incentive Mechanism for Constructing Minimum Delay Multicast Among Selfish End Users", Information Processing Society of Japan, IPSJ SIG Technical Report, vol. 2006, No. 96, Sep. 15, 2006, pp. 55-60.

Habb et al., Incentive Mechanism for Peer-to-i"eer Media Stiearning," Proceedings 2904 12th IEEE International Workshop on Quality of Service, Jun. 7, 2004, pp. 171-180.

Kawai et al., "A Time Based Appraising Method in Cached Peer-to-Peer Networks," IEICE Technical Report CST2005-39 to 52, The Institute of Electronics, Information and Communication Engineers, vol. 105, No. 573, Jan. 27, 2006, pp. 69-74.

Cohen, "Incentives Build Robusiness in Bit Torrent", May 22, 2003, In Proceedings of the First Workshop on the Economics of Peer to Peer Services, Berkeley, pp. 1-5.

* cited by examiner (b) Tax rate function with flooring (c) Tax rate function considering flooring and saturation (a) Variation of incoming degree for a typical low contributor (b) Variation of incoming degree for a typical high contributor (c) Average incoming degree of peers based on their life time (a) Distribtuion of weighted avg. in-degree- Tax=2

(b) Avg. parent disconnection rate due to Churn (c) Avg. parent disconnection rate due to Preemption (a) Computed Entitled connections-Rounded down (b) Weighted avg. Entitled (c) Weighted avg. in-degree (d) Avg. entitled and excess in-degree-HighBW peers (e) Avg. entitled and excess in-degree-LowBW peers (a) Weighted avg. out-degree (c) Rate of disconnection due to preemption (a) Computed Entitled connections-Rounded down (b) Weighted avg. Entitled (c) Avg. entitled and excess in-degree-HighBW peers (d) Avg. entitled and excess in-degree-LowBW peers (e) Weighted avg. out-degree (a) Weighted avg. in-degree (b) Avg. entitled and excess in-degree-HighBW peers (c) Avg. entitled and excess in-degree- LowBW peers (a) Weighted avg. in-degree (b) Avg. entitled and excess in-degree- HighBW peers (c) Avg. entitled and excess in-degree-LowBW peers (d) Avg. in-degree for high BW peers with different life time (e) Avg. in-degree for low BW peers with different life time (f) Normalized frequency of churn for peers with different life time

CONTRIBUTION AWARE PEER-TO-PEER LIVE STREAMING SERVICE

This application claims the benefit, under 35 U.S.C. §365 of International Application PCT/US2007/007220 filed Mar. 23, 2007, which was published in accordance with PCT Article 21(2) on Jun. 5, 2008 in English and which claims the benefit of PCT patent application No. PCT/US2006/045588 filed Nov. 29, 2006.

FIELD OF THE INVENTION

The present invention relates to peer-to-peer networking in general, and specifically to incentive based live streaming over a peer-to-peer network.

BACKGROUND OF THE INVENTION

In a peer-to-peer (P2P) live streaming environment, there are two types of approaches: tree based and mesh based. Some work has been done in providing contribution aware P2P live streaming for the tree based approach. No known work has been done to provide contribution aware P2P live streaming for the mesh based approach. The mesh based approach, however, outperforms the tree based approach in terms of robustness, efficiency, etc.

In the mesh based approach to P2P live streaming, the environment is characterized by peers having constrained heterogeneous outgoing bandwidth. It is desirable to provide contribution aware P2P live streaming for a mesh based approach where the peers have constrained heterogeneous outgoing bandwidth.

SUMMARY OF THE INVENTION

Live streaming will be described herein in terms of video but can also include any type of live streaming media such as digital audio. As used herein, a "/" denotes alternative names for the same or like components. In one embodiment of the invention, mesh-based peers maintain a randomly connected and directed overlay/mesh. In a mesh based approach to P2P live streaming peers/users receive different levels of service proportional to their willingness to contribute to the network, where the willingness is measured by the peer's contribution of uplink bandwidth to the mesh overlay divided by the bandwidth per flow.

Peer-to-peer streaming overlays consist of peers with heterogenous, asymmetric and limited bandwidth. In one approach to maximizing the delivered quality to individual peers in such an environment, an exemplary system ensures that the delivered quality to each peer is proportional to its contribution. In essence, the delivered quality in an exemplary resource-constrained system is contribution aware. According to an exemplary embodiment of the invention, a contribution awareness mechanism is incorporated into a mesh-based peer-to-peer live streaming system.

In one embodiment, participating peers incorporate swarming content delivery where a child peer pulls its required packets from one or more parent peers. To form an overlay, each peer maintains a certain number of parent peers from which it pulls its required content. Each peer also serves as a parent for a specific number of child peers and provides content to them.

A peer that wants to join a P2P network is denoted herein as a joining or requesting peer. A bootstrap node is a node that behaves as a gatekeeper. A joining peer contacts the bootstrap node in order to join the P2P network. The bootstrap node informs the joining peer of the total number of peers/users in the P2P network. In exchange, the joining peer advises the bootstrap node of its willingness to contribute measured by the bandwidth the joining peer is willing to contribute to the P2P overlay/network. Using the information provided by the bootstrap node, the joining peer calculates the number of parent peers to which it can be connected. In one embodiment of the invention the bootstrap node maintains status information for all participating peers. In response to a request from a joining/requesting peer, the bootstrap node provides a randomly selected a set of parent/participating peers that can accept new child peers for an incoming request:

Each peer attempts to maintain a certain number of entitled parent peers ($r_t$) based on the status of the overlay and its own bandwidth contribution. This, in turn, determines the bandwidth, and consequently the quality of communications, that the peer can receive. Each individual peer serves a specific number of other peers as children based on its willingness and the availability of child peers.

A contribution aware method and system for live streaming in a peer-to-peer network are described including computing peer entitled and excess degree, identifying and contacting a potential parent peer and executing a connection policy.

In one embodiment, participating peers form an overlay over which individual peers contribute their outgoing bandwidth by forwarding a subset of their available content to their connected peers. In a tree-based approach, participating peers form one or multiple tree shaped overlays, and each peer pushes the whole stream or a particular portion of it (e.g., a sub stream or a description) to each connected peer.

In a further embodiment of the invention, a contribution aware peer-to-peer system includes at least one saturated peer. A saturated peer is defined to be a peer whose entitled degree is greater than the maximum allowed degree. The peer degree can only take an integer value. In one embodiment, a peer has an "actual incoming degree and an excess degree".

A method of admitting a joining contribution-aware peer to a peer-to-peer network is described including receiving a plurality of system parameters at the joining peer, the plurality of system parameters further including a system resource index and calculating an entitled incoming degree value for the joining peer, the calculated entitled incoming degree reflecting a value of the system resource index. Also described is a bootstrap node for a contribution-aware peer-to-peer network including a processor device and a network interface device coupled to the processor device, the network interface device being adapted to be coupled to a communication network, the processor device being adapted to receive a request for potential parent peer identification information from the communication network through the network interface device and whereas the processor device is adapted to respond with a plurality of device identification values and a system parameter.

In one embodiment of the invention, a contribution aware mesh based peer-to-peer streaming peer receives quality that is proportional to its contribution. In another embodiment of the invention, resource utilization is greater than 95% regardless of cost factor/tax rate. In still another embodiment of the invention additional preemption policies are eliminated and willingness of a peer (rather than current contribution) is considered, resulting in significantly increased overlay stability. In a still further embodiment of the invention, the described contribution-aware mechanism is scalable and desirably works regardless of group size. According to still another embodiment of the invention, increasing frequency of distribution of information in the overlay reduces the overhead of messages while decreasing the received quality of short-lived peers. In still another embodiment of the invention, the total number of connections determines the delivered quality, not the identity of those connections.

Various embodiments of the invention are further described in a paper entitled "Incorporating Contribution-Awareness into Mesh-Based Peer-to-Peer Streaming Services" by Nazanin Maghaeri, Reza Rejaie and Yang Guo, dated . . . , and published in . . . .

A communication network as used herein includes a peer-to-peer network, which is an overlay on a communications network. It should be noted that the communications network as used herein can be wired line or wireless.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

Figure 1:
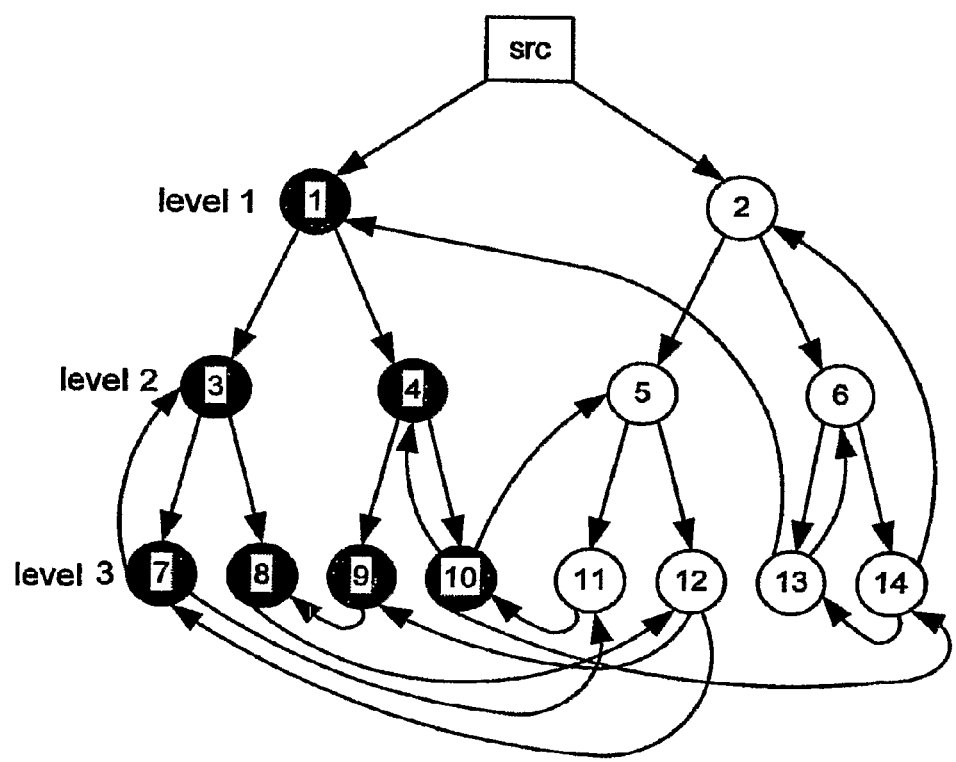
FIG. 1 is a schematic diagram of a diffusion tree.

According to one embodiment of the invention, a selection policy for distributing bandwidth among participating peers is based on the contribution of the peers in the P2P network. Assuming there are N peers and peer i's ($p_i$) willingness is $W_i$, the heuristics described herein determine the total number of entitled parent peers $R_i$ that $p_i$ can have. A generic cost function is used to determine the number of entitled parents that each peer can have:

$$R_i = \frac{1}{t} W_i + \frac{t-1}{t} \sum_{i=0}^{N} \frac{W_i}{N} \qquad (1)$$

where $R_i$ is the entitled parent peers (also called entitled degree), N is the number of participating peers, $W_i$ is the willingness of $p_i$ and t is the tax rate/cost factor. By using a tax rate/cost factor greater than one, it is assured that there is extra bandwidth in the system.

The parent discovery process occurs after the number of entitled parent peers, $R_i$ is determined. Each peer should locate at least $R_i$ number of parent peers with which to connect (to form a connection). The parent discovery process should distribute the bandwidth in a fair and timely fashion. Described herein are three different approaches to enable peers to discover appropriate parent peers: centralized, distributed and semi-distributed. Also described herein is a device that can locate the appropriate parent peers for a joining/requesting peer.

Delivery of a live multimedia stream through P2P overlays is a promising approach to support one-to-many streaming over the Internet. This approach is generally referred to as P2P streaming. In P2P streaming, participating users (peers) actively contribute their resources (both bandwidth and storage space) by forwarding their available content to other peers. The aggregate available resources scale with the user/peer population and can potentially accommodate any number of participating peers. Participating peers form an overlay over which individual peers contribute their outgoing bandwidth by forwarding a subset of their available content to their connected peers.

Most of the effort in designing P2P streaming protocols has been restricted to an environment with highly provisioned resources in the system. However, some important aspects that have been largely ignored, and are critical in real deployments, are peers with asymmetric, heterogeneous bandwidth and insufficient resources in the overlay. The present, invention addresses these issues by considering highly heterogeneous environments where hosts make unequal contributions to the overlay due to their limited outgoing bandwidth or lack of willingness. Moreover, in these environments the total resources in the system may not be sufficient for everyone to receive full quality of the stream.

It is desirable to enable peers to receive stream quality proportional to their contributions while effectively utilizing all resources in the system. These policies can better utilize bandwidth of high-bandwidth peers, offer better quality to low bandwidth peers and encourage peers to contribute more to receive higher quality. Possible methods of monitoring the overall system resources are discussed including centralized, distributed and semi-distributed.

PRIME is a live streaming technique in which each P2P streaming system consists of two major components: (i) an overlay construction, that organizes participating peers into an overlay and (ii) content delivery that determines delivery of content to individual peers through the overlay. According to one embodiment of the present invention, these features are combined with a contribution awareness mechanism.

Participating peers form a randomly connected overlay or mesh, which is a directed graph. Each peer maintains a certain number of parent peers from which it retrieves content, and a certain number of child peers to which it delivers content. For each peer, the number of parent peers and the number of child peers are denoted as that peer's incoming and outgoing degree, respectively. To effectively utilize access link bandwidth of participating peers, the incoming and outgoing degree of each peer is set proportional to its available incoming bandwidth $b_{down}$ and outgoing bandwidth $b_{up}$. The ratio of incoming (or outgoing) bandwidth to incoming (or outgoing) degree represents the average bandwidth of each connection, which is called bandwidth-per-flow or bwpf.

Bwpf is a configuration parameter that is selected a priori and known by individual peers. Specifically, the incoming and outgoing degree of a peer is set to be $b_{down}$/bwpf and $b_{up}$/bwpf, respectively. In such an embodiment, each connection roughly offers the same amount of data rate to the receiving peer. Therefore, according to one embodiment, a peer's reception quality is proportional to its number of incoming peers.

In one embodiment, a swarm-like content delivery mechanism is employed for content delivery. The main advantages of the swarming content delivery are its ability to effectively utilize the outgoing bandwidth of participating peers and its robustness against the dynamics of peer participations (or churn). Swarm-like content delivery incorporates push content reporting with pull content requesting. As a parent peer, each peer periodically reports its newly received packets to its child peers. As a child peer, each peer periodically requests a subset of required packets from each of its parent peers based on the reported available packet at each parent peer and the available bandwidth from each parent peer to the requesting child peer. In one embodiment, these child peer requests are made on a periodic basis.

The requested packets from each parent peer are determined by a packet scheduling algorithm. In one embodiment a parent peer periodically receives a list of requested packets from child peers, and delivers the packets in the requested order. Each parent peer delivers the packets requested by each child peer through a congestion controlled mechanism such as TCP or RAP. In one embodiment, the information for each peer is periodically updated with each instance of a heart-beat message.

To accommodate the bandwidth heterogeneity among peers, in one embodiment, the content is encoded with multiple description coding (MDC). MDC organizes streaming content into several sub-streams, where each sub-stream is independently decoded. The delivered quality to each peer is proportional with the number of independent sub-streams that it receives. MDC coding allows each peer to receive an appropriate number of sub-streams that are delivered through its access link bandwidth.

A packet scheduling algorithm should achieve the following two goals:

(i) fully utilizing the available bandwidth from each parent peer; and (ii) ensuring in-time delivery of packets requested by child peers.

In various embodiments, the effectiveness of the system is determined according to whether or not each peer has a proper number of child peers so that its resources are effectively utilized and each peer can identify and establish connections with a proper number of parents proportional to its share of available resources. Accordingly, in some embodiments, evaluation of performance of the contribution awareness mechanism is based solely on productivity among peers, without considering content delivery mechanisms and the actual delivered quality. In one embodiment, the performance of a contribution aware mechanism for mesh-based peer-to-peer streaming is assessed based on an ability of one or more individual peers to keep their respective incoming and outgoing degrees at particular values.

In at least one embodiment, the pattern of delivery of individual packets through the overlay mesh (the path that a packet traverses to reach from the source to each peer) depends on the collective behavior of the packet scheduling algorithm at all participating peers as well as the topology of overlay mesh. In various embodiments, each peer keeps track of the available bandwidth (through passive measurement) and available content at each parent peer (using periodic reports).

Given this information, the scheduling algorithm is periodically invoked to determine the requested packets from each parent peer in two steps. First, the scheduler identifies new packets with the highest timestamps that have become available among parent peers during the last reporting period. These new packets are always requested by child peers from parent peers. Second, in one embodiment, a random subset of other missing packets is requested from each parent peer to fully utilize incoming bandwidth. To achieve load balancing, if a packet is available at more than one parent peer, it is requested from a parent that has the lowest ratio of requested packets to the total packet that can be served by the parent peer.

According to various embodiments, the bootstrap node implicitly coordinates the connections among peers, thereby increasing the probability of success during the parent discovery process. It should be noted that, in at least one embodiment a parent may reject a request due to a recent change in status of a contacted peer. According to one embodiment, a request that a contacted peer serves as a parent is preceded by exchange of minimum local state information (i.e., $W_i$, $a_i$, and $R_i$).

In some embodiments employing the scheduling algorithm described above, each segment of the content is delivered to individual participating peers in two phases: diffusion phase and swarming phase. During the diffusion phase, each peer receives any piece of a new segment from its parent peer in the higher level (closer to the source). Therefore, pieces of a newly generated segment are progressively pulled by peers at different levels. For example, pieces of a newly generated segment are pulled by peers in level 1 after one time period ($\Delta$), and then pulled by peers to level 2 after 2*$\Delta$ and so on. After d time periods, all peers in the overlay have one piece of the new segment.

Thus, in some embodiments, each piece of a segment is delivered only once by the source. Therefore, the group of peers that receive a piece of the segment during the diffusion phase form a tree that is rooted in a peer in level 1 and is called the diffusion tree. Shaded nodes in FIG. 1 form a diffusion tree. All connections from peers in level i to their child peers in level i+1 are called diffusion connections. These connections are located on a diffusion tree.

During the swarming phase, each peer receives all the missing pieces of a segment from its parent peer in the same or lower levels (farther from source). These parent peers are called swarming parents. The swarming phase may take more than one time period since swarming parents may not have all the missing pieces of the segment. Except for the diffusion connections, all other connections in the overlay mesh are swarming connections. The collection of swarming connections forms a directed mesh that is called the swarming mesh. The swarming mesh is used to exchange different pieces of each segment between different diffusion trees.

In summary, each piece of any new segment is diffused through a particular diffusion tree during the diffusion phase of that segment. Then, the available pieces are exchanged between peers in different diffusion trees through the swarming mesh during the swarming phase for the segment.

Figure 2:
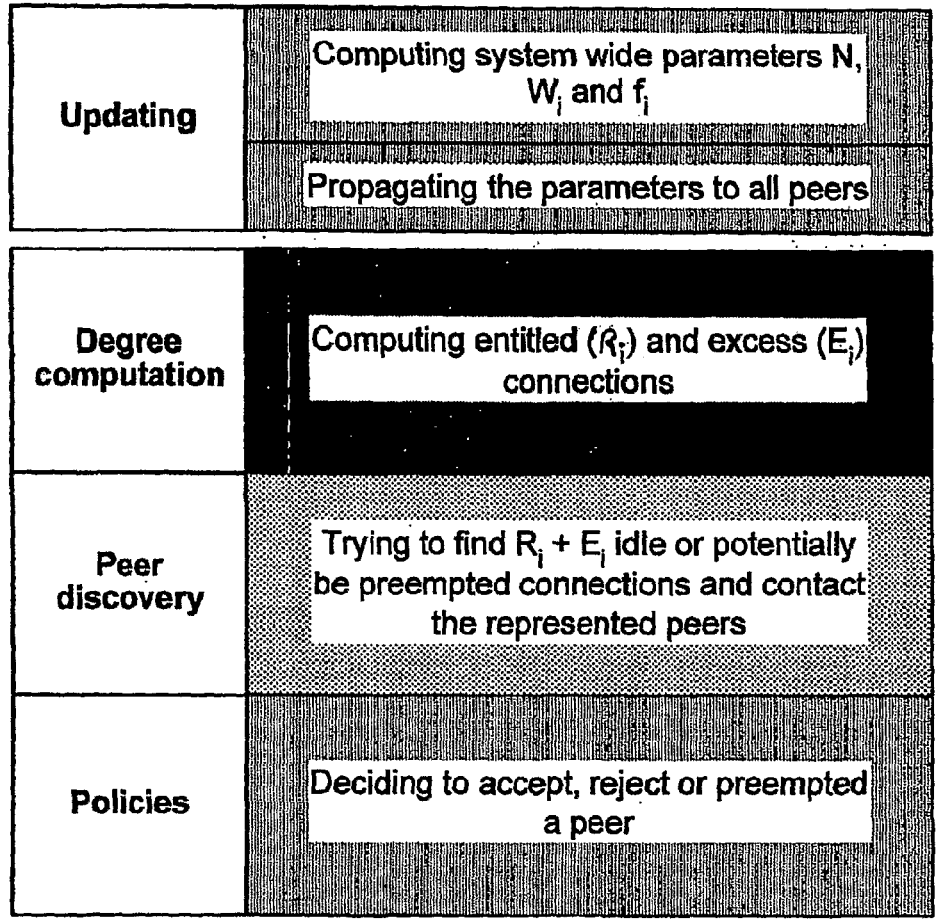
FIG. 2 shows the major primitives of the system in accordance with the present invention.

To enable peers to receive quality proportional to their contribution in the system, the P2F streaming technique described above is augmented with the following four mechanisms shown in FIG. 2.

1. System-level information updating and propagation
2. Peer entitled and excess connections computation
3. Peer discovery
4. Policies Referring to FIG. 2, the policy primitive "updating" represents the need to compute the system wide parameters N, $W_i$ and the actual contribution of pi ($f_i$), and propagate the parameters to all peers in the network. The entitled ($R_i$) and excess ($E_i$) incoming degree is computed for each peer in accordance with the equations given below.

In a distributed peer discovery embodiment, attempts are made to locate $R_i+E_i$ idle parent peers, or parent peers with potentially preemptable child peers, by contacting potential peers from the entire pool of peers. In a centralized peer discovery embodiment, attempts are made to locate $R_i+E_i$ idle parent peers, or parent peers with potentially preemptable child peers, through a set/list/queue of peers selected by the bootstrap node. In other embodiments, alternative approaches are used, including embodiments having combined features of the centralized and distributed peer discovery embodiments. If a potential peer is located that is already connected, a rule according to Table 2 is used to determine if a child of the potential peer is preemptable. If a child peer is preemptable, then the child peer is preempted.

The system-level parameters need to be updated and propagated over the course of live streaming. These parameters include N, $W_i$ and $f_i$, as defined in Table 1. Upon arrival, according to one embodiment, the joining peer contacts the bootstrap node and informs the bootstrap node of its willingness to serve other peers ($W_i$). At about the same time, in one embodiment, the joining peer receives a list of potential parent peers, to which it can connect to. The bootstrap node, in such an embodiment, has the information about the total number of peers in the system, N, and the aggregated willingness of all peers, $\Sigma(W_i)$.

When a peer departs, it should contact the bootstrap node and un-register (i.e., register its departure) from the overlay. A peer may fail to un-register from the overlay if there is a crash or other fatal condition. Otherwise, the exiting peer should advise the bootstrap node of its departure from the overlay. For example, according to one embodiment of the invention, each peer sends a BYE message to the bootstrap node immediately before its departure. If the bootstrap node does not receive a heart-beat message from a peer for a specified time interval (e.g., 2*τ seconds—where "τ" is a standard time interval such as a heartbeat interval), it assumes that the peer has departed and remove that peer's record. The bootstrap node, in one embodiment, maintains an updated state of individual peers and thus can easily determine features of the group-level state such as N and PWi.

TABLE 1

Definition of Important Symbols

| Symbol | Definition |
|---|---|
| N | total number of peers in the system |
| $W_i$ | the willingness of $p_i$, measured by degree, i.e, its bandwidth contribution to the overlay divided by bandwidth-per-flow, bwpf |
| $f_i$ | actual contribution (outgoing degree) of peer i |
| $R_i$ | computed entitled incoming degree of $p_i$ |
| $E_i$ | computed excess incoming degree of peer i |
| $r_i$ | actual entitled incoming degree of peer i |
| $e_i$ | actual excess incoming degree of peer i |
| Max | the number of connections required to receive full quality live stream |

The actual contribution $f_i$ of a peer $p_i$, varies over time. Hence the system needs to periodically refresh this information in order to compute the aggregated contribution of all peers $\Sigma(f_i)$. The computation can be performed in various ways including the two exemplary methods described as follows:

Centralized updating: In this approach, the peers contact the bootstrap node whenever their actual contribution changes.

Distributed updating: In this approach, contribution information is propagated along a diffusion tree. A peer periodically updates its parent peer in the diffusion tree regarding its current contribution plus the aggregated contribution of its descendant (child) peers (in the diffusion tree). The first-level peers will send the updates to the global bootstrap node. In distributed updating, the value of $\Sigma(f_i)$ may not be accurate since the information is only updated periodically (or sporadically, depending on the embodiment). However, by adjusting the time interval between updates, sufficient accuracy is achieved.

The aggregated information of N, $\Sigma(W_i)$ and $\Sigma(f_i)$ also needs to be propagated to all peers in order for the peers to compute the number of entitled and excess incoming connections, as described below. This propagation can also be done by centralized or distributed schemes. In an exemplary centralized scheme, the bootstrap node periodically informs all peers of the current value of N, $\Sigma(W_i)$ and $\Sigma(f_i)$. In an exemplary distributed scheme, the information is distributed through the diffusion tree, from the root (bootstrap node) to all peers.

The goal of the parent discovery mechanism is to enable each peer to locate the required number of parents to establish the desired number of connections. According to one embodiment of the invention, each peer always establishes $R_i$ entitled connections and then explores possibilities for establishing excess connections. In one such embodiment, the entitled degree $R_i$, of peer i, is computed using the following formula:

$$R_i = \left\lceil \min\left\{ \frac{1}{t}W_i + \frac{t-1}{t}\sum_{i=0}^{N}\frac{W_i}{N}, \text{Max} \right\} \right\rceil \quad (2)$$

where t is the parameter denoted as tax rate/cost factor and t>1 in order to ensure extra bandwidth in the system. $R_i$ is essentially the sum of two terms. The first term represents the minimum bandwidth a peer is entitled to receive by contributing $W_i$ and the second term is the average remaining bandwidth per peer. The computed excess incoming degree of peer i is:

$$E_i = \text{Max} - R_i. \quad (3)$$

Once a peer computes its entitled degree, it attempts to find peers that have excess degree to support it. That is, the peer having excess degree seeks parent peers that can help the peer with excess degree make additional connections. In this way the peer with excess degree improves its contribution and thereby improves its quality. The peer discovery process can be done using three different approaches described below.

It should be noted that, according to one embodiment of the invention, each child peer does not label its incoming connections from parents as entitled or excess. Instead, a child peer only keeps track of its actual number of connections ($a_i$) and its entitled degree $R_i$. $R_i$ is periodically updated after each report from the bootstrap node. This is feasible because, in various embodiments of the invention, all connections have the same bandwidth.

In centralized peer discovery, the bootstrap node maintains a table that keeps track of every peer in the system. Each peer has, for example, one entry in the table, (id, $W_i$, $f_i$, $e_i$, $r_i$), where id is the peer identification. The difference between $W_i$ and $f_i$, indicates the number of empty slots at this peer. In one embodiment, every peer in the system also maintains a table of all its child peers in the diffusion tree, and their corresponding parameters. According to one embodiment, during a session each peer sends a heart-beat message to the bootstrap node once every τ seconds (where τ is a standard time interval, as discussed above). With the heartbeat message, the peer reports the value of its dynamic properties, including actual outgoing degree ($f_i$) and incoming degree ($a_i$) along with its entitled degree ($R_i$) and a list of its parents.

Thus, according to one embodiment of the invention, the bootstrap node periodically reports the most recent group-level state to all participating peers. In one exemplary embodiment, this report is made every τ seconds. In one embodiment, when a peer receives a new report from the bootstrap node, it determines the number of its entitled connections ($R_i$) using equation (2) above. If the value of $R_i$ is larger than the corresponding peer's current incoming degree, the peer continues discovery for more parents. In contrast, if its entitled incoming degree has dropped, the peer increases $e_i$ accordingly.

The update period τ is therefore a configuration parameter that, in one embodiment, determines the tradeoff between the freshness of state information at the bootstrap node and the signaling overhead. More specifically, increasing the value of τ reduces the signaling overhead.

Note that, in one embodiment, peers do not presumptively disconnect their incoming connections due to drop in their $R_i$, rather they increase their actual excess incoming degree. Upon demand and proper preemption extra excess connections might be disconnected by parent peers. This approach reduces dynamics and induced churn in the system associated with state collection and reporting at the cost of lower accuracy for the state information at the bootstrap node. For example, in one embodiment the default value of τ is 10 seconds.

In various embodiments, each peer sends a BYE message to the bootstrap node shortly before its departure. If the bootstrap node does not receive a heart-beat message from a peer for 2*τ seconds, it assumes that the peer has departed and removes its record. According to one embodiment of the invention, the bootstrap node maintains an updated state of individual peers and thus can easily determine the group-level state such as N and ΣWi. According to one embodiment of the invention a normalized parent disconnection rate due to churn does not depend on peer bandwidth.

Referring now to FIGS. 3A-3E, to establish an entitled or excess connection, each peer first needs to obtain the contact information for a subset of participating peers that are likely to be able to accommodate more child peers from the bootstrap node. Thus, in one embodiment of the invention, the requesting peer (peer requesting discovery of potential peers to which it can connect) sends a request to the bootstrap node together with its own parameters of $r_A$, $e_A$, $f_A$ (1).

Since, according to one embodiment, the bootstrap node maintains the state of all participating peers (i.e., potential parents), it can identify potential parents and provide a random subset of them to a peer that is looking for more parents. Thus, in one embodiment the bootstrap node returns a list of all potential parent peers that can potentially accept the requesting peer and become parent peers (1) to the requesting node.

Given a list of potential parents from the bootstrap node, according to one embodiment, each peer sequentially contacts each peer in the list, provides its local state (i.e., $W_i$, $a_i$ and $R_i$) and requests the contacted peer to serve as its parent. A peer accepts or declines a request to serve a parent based on the local preemption policy as is described below.

If a contacted peer agrees to serve as a parent for a peer p, peer p updates the number of its entitled and excess connections accordingly and provides its updated information at its next heart-beat to the bootstrap node. Again, according to one embodiment, the peer sends its local state (i.e., $a_i$ and $R_i$) to its parents also, piggybacked in data packets. Each peer continues to establish connection to more parents until its incoming degree reaches its maximum value (or Max). In a further embodiment of the invention, if all first-provided list of potential parents is exhausted, the peer will contact the bootstrap node to obtain a new list of potential parents.

A local preemption policy determines how a parent peer reacts to a request for connection from a child peer. If the outgoing degree of a parent peer is less than the maximum outgoing degree that it is willing and able to contribute ($r_i < W_i$) then, according to the preemption policy, a request for connection is accepted. However, if the outgoing degree of a parent peer is fully utilized, then a new child peer A can only replace (or preempt) an existing child peer B if providing a connection to child peer A has a higher priority.

In one embodiment, proper parents are selected using the same local preemption policy that is employed by parents. In another embodiment, different preemption policies are used by parent and child peers. When peer p requests a list of potential parents from the bootstrap node, the bootstrap node selects a random subset of participating peers that have at least one child that can be preempted by peer p. In essence, the bootstrap node implicitly coordinates the connections among peers. This, in turn, increases the probability of success during the parent discovery process. It is worth noting that despite this coordination, it is possible that a parent will reject a request, as for example when the status of the contacted peer has recently changed.

The relative priority of connection between peers A and B is determined in four scenarios as illustrated in table 2-A below:

TABLE 2-A

| A | B | |
|---|---|---|
| | Entitled | Excess |
| Entitled | Yes if $(r_A + e_A)/f_A < (r_B + e_B)/f_B$ | Yes |
| Excess | No | Yes if $(e_A)/f_A < (e_B)/f_B$ |

Table 2-A represents the first embodiment policy used in determining if peer A can preempt peer B in order to use the connection/slot that is currently being used by peer B at its parent node/peer.

Examples of how to use Table 2-A to determine if the current connection is preemptable are as follows. Assume that peer B is already connected to a particular parent peer. In the first instance both peer A ($p_a$) and peer B ($p_a$) have entitled degree. The actual contribution (outgoing degree) of $p_a$ is $f_a$. The actual entitled incoming degree of $p_a$ is $r_a$. The actual excess incoming degree of $p_a$ is $e_a$. Similarly for $p_b$. If $f_a$=20, $r_a$=2 and $e_a$=0, then $(r_a+e_a)/f_a$=2/20=1/10. If $f_b$=20, $r_b$=5 and $e_b$=0, then $(r_b+e_b)/f_b$=5/20=1/4. Since the calculation for $p_a<p_b$, $p_a$ can preempt $p_b$. In the second instance, $p_a$ has entitled degree and $p_b$ has excess degree. Using the same values for the parameters of $p_a$, $p_a$ once again has a calculated value for $(r_a+e_a)/f_a$=2/20=1/10. If $f_b$=5, $r_b$=2 and $e_b$=1, then $(r_b+e_b)/f_b$=3/5. Once again since the calculation for $p_a<p_b$, $p_a$ can preempt $p_a$. In the third instance, $p_a$ has excess degree and $p_b$ is entitled. In this case $p_a$ cannot preempt $p_b$. In the fourth instance, both $p_a$ and $p_b$ have excess degree. If $f_a$=5, $r_a$=2 and $e_a$=0 then $e_a/f_a$=0/5=0. If $f_b$=5, $r_b$=2 and $e_b$=2, then $e_b/f_b$=2/5 so $p_a$ can preempt $p_b$ since the ratio $e_a/f_a$ is less than the ratio $e_b/f_b$. It should be noted that $r_a$ and $r_b$ are not used in this instance.

As discussed above, once the requesting peer receives the list from the bootstrap node (2), it contacts the peers in the list sequentially (2). If the contacted peer has empty slots, it will admit the requesting peer and the peer becomes the child of this contacted peer. If the contacted peer does not have empty slots; the policy as set forth in Table 2-A is used to determine if the requesting peer can preempt one of the contacted peer's child peers. If the requesting peer can preempt on of the contacted child peers then the contacted peer disconnects the child peer that is selected to be preempted and assigns the connection/slot to the requesting peer. Otherwise, the requesting peer is informed that it cannot be admitted. Although all peers in the returned list are potential parent peers, they may not be able to admit the requesting peer due to the following reasons:

1. The parameters maintained at the bootstrap node may not be up-to-date due to the delay between the state change and the time the parameter is updated.
2. The values of $r_A$, $e_A$, $f_A$ change over the time as the requesting node obtains more parent peers.

The process of contacting the peers in the list (including children of peers) continues until either the requesting peer obtains required number of peers or the list is exhausted. In the latter case, the requesting peer will sleep for a period of time of T and initiate the process described above again.

In one embodiment, the relative priority of connection between peers A and B is determined in four scenarios as illustrated in table 2-B below:

TABLE 2-B

| A | B | |
|---|---|---|
|   | Entitled | Excess |
| Entitled | Yes if $\frac{r_A}{W_A} < \frac{r_B}{W_B} - 1$ | Yes |
| Excess | No | Yes of $e_A < e_B - 1$ |

In the table 2-B embodiment of the invention, when peer i's request for connection is rejected by a potential parent, peer i's reaction depends on its current state as follows:

En-Ex Scenario: If peer A is looking for entitled connection ($a_A < R_A$) when peer B already has some excess connections ($a_B > R_B$), then a request by A can always preempt an existing connection to peer B. This policy allows a new peer to easily reach its entitled incoming degree by preempting excess connections to other peers.

Ex-En Scenario: If peer A is looking for an excess connection ($a_A > R_A$) when peer B only has entitled connections ($a_B \leq R_B$), then a request by A can not preempt an existing connection to peer B.

En-En Scenario: If both peers only have entitled connections, then A can only preempts the connection to B if the normalized incoming degree of A is less than B, i.e., the following condition is satisfied: $r_A/W_A < (r_B/W_B - 1)$.

Ex-Ex Scenario: If peer A is looking for excess connections ($a_A > R_A$) and peer B has some excess connections ($a_B > R_B$), A can preempt an existing connection to peer B when it has a smaller number of excess connections (i.e., $e_A < e_B - 1$). Again, this condition also prevents oscillating preemption between two peers.

Table II-B summarizes the above local preemption policy by a new peer A to an existing child peer B. Note that when a new peer joins the system or an existing peer loses its parent due to preemption, they start the parent discovery process and could in turn preempt another peer in the system. Therefore, the observed rate of change in parents among participating peers is higher than parent departure rate that occurs only due to churn. In essence, the preemption further aggravates the instability of the overlay. In one embodiment, stability of the overlay is quantified by measuring a rate of change among parents of individual peers. In another embodiment, changes in parents are divided into two groups: changes that are due to a parent departure versus changes that are due to preemption by other child peers.

A potential parent peer of the requesting peer is defined as follows:
1. If a peer has empty slots, then it is a potential parent peer.
2. If a peer (denoted as peer B) can be preempted by the requesting peer (denoted as peer A) based on the policy defined in Table 2-B, then peer B's parent peer is a potential peer.

The tree-based P2P streaming mechanism should specifically label each connection because each connection provides a particular description. If the current number of parents for peer i is less than its entitled incoming degree ($a_i < R_i$), the peer is still trying to reach its entitled incoming degree. Therefore, it immediately sends a request to the next potential parent in the provided list by the bootstrap node. This rather aggressive approach to discovery is reasonable because there must be sufficient resources in the system such that each peer can reach its entitled incoming degree. If the current number of parents for peer i is greater or equal to its entitled degree, peer i has already established its entitled degree and is looking for excess connections.

In this case, a rejected request is an indication of limited excess resources in the system. Therefore, the rejected peer waits for an interval $t_{wait}$, called wait interval, before it sends another request for connection. The wait interval is exponentially backoff with each rejected request for excess connection as follows:

$$t_{wait} = t_{min} * K * (e_i + \beta^{ret})$$

where $t_{min}$ is the minimum backoff time, K is a random number larger than 1, which is a backoff factor and ret is the number of consecutive failures. In one embodiment, $t_{min}$ is set to 5 sec and $\beta$ is 2. As indicated above, the amount of excess resources is not known and is dynamically changing with churn. This adaptive approach for determining wait time adjusts the excess degree of individual peers ($e_i$) as well as the aggregate demand for excess connection without any explicit coordination among peers.

Parent discovery can be performed in a distributed fashion. For example, similar to multiple tree-based P2P streaming approach, a peer can traverse the diffusion tree (starting from the source) and examine each peer to find a proper number of parents with desired type. While this approach does not require a central coordination point, it can introduce a heavy load to participating peers (especially those at the higher levels of the diffusion tree) due to constant request for parents by newly arriving peers. The centralized approach presented here properly represents such a contribution aware mechanism.

Figure 3A:
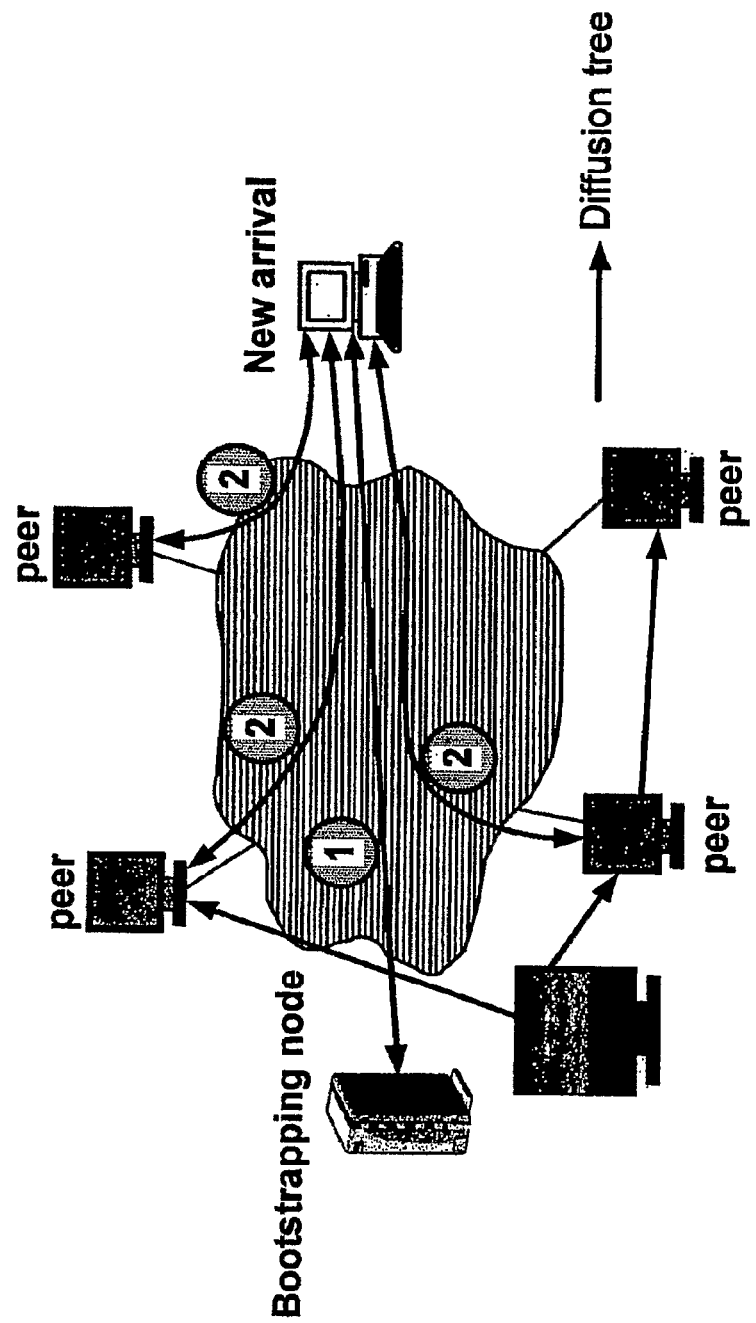
FIG. 3A is a schematic diagram of the centralized method of peer discovery.
Figure 3B:
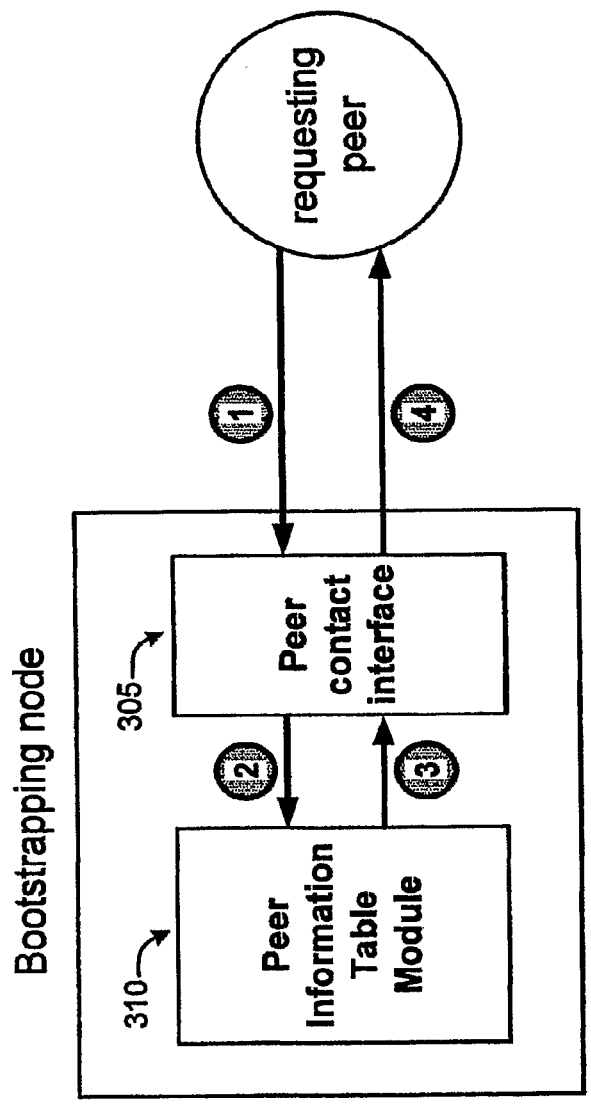
FIG. 3B is a block diagram of the communication between a requesting peer and the bootstrap node in the centralized peer discovery method.

FIG. 3B is a block diagram of the communication between a requesting peer and the bootstrap node in the centralized peer discovery method. For each peer there is one entry in the peer information table (id, $W_i$, $f_i$, $e_i$, $r_i$). The requesting peer send a join request to the peer contact interface 305 in the bootstrap node (1). The peer contact interface 305 then forwards a lookup request to the peer information table module 310 (2). The peer information table module 310 performs the lookup operation on the peer information table and returns a list of potential parent peer list to the peer contact interface 305 (3). The peer contact interface 305 then returns the list containing the peer information requested to the requesting peer.

Figure 3C:
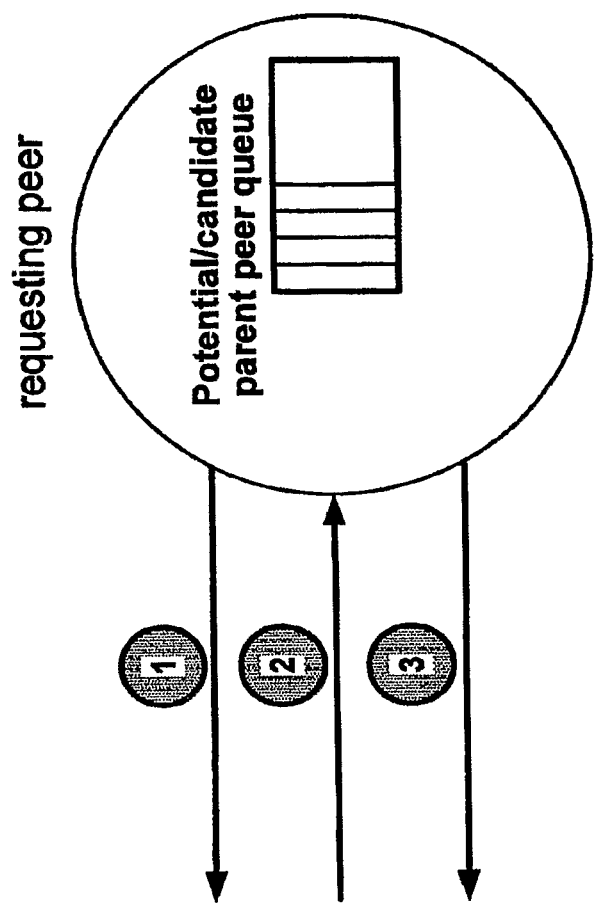
FIG. 3C is a schematic diagram of the detailed operation of the requesting peer of FIG. 3B.

FIG. 3C is a schematic diagram of the detailed operation of the requesting peer of FIG. 3B. The requesting peer contacts the bootstrap node with a join request (1). The bootstrap node returns a list of potential parent peers (2). The requesting peer enters the list of potential parent peers into a potential/candidate parent peer queue. The requesting peer then takes each potential parent peer from the queue sequentially and contacts the potential parent peer to see if the requesting peer can be admitted and thus, become its (or one of its) child peers (3).

Figure 3D:
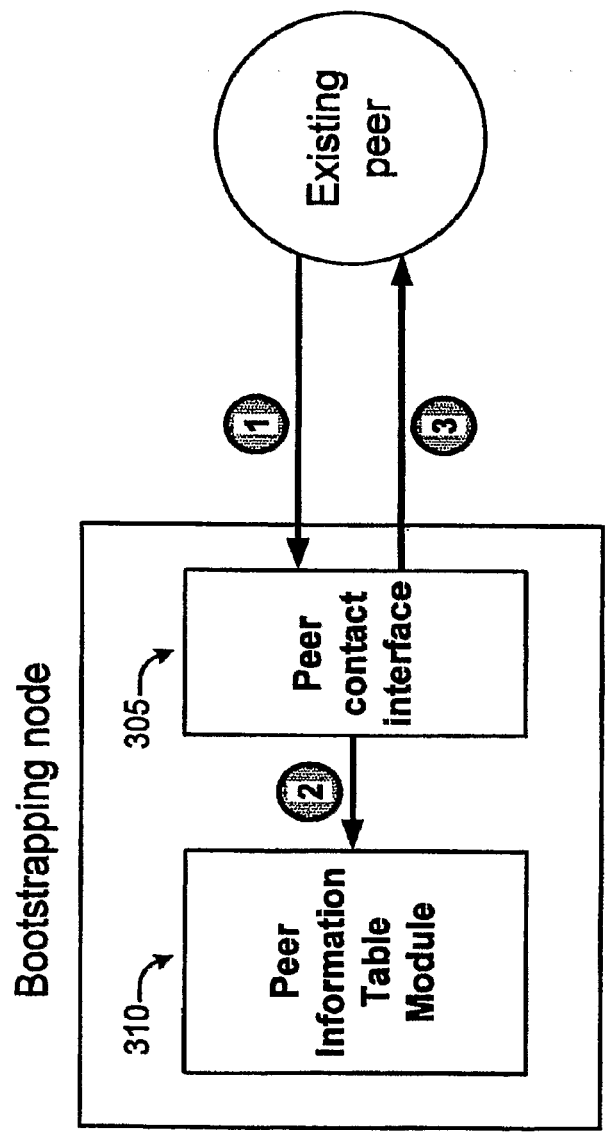
FIG. 3D is a block diagram of the communication between an existing peer and the bootstrap node in the centralized peer discovery method.

FIG. 3D is a block diagram of the communication between an existing peer and the bootstrap node in the centralized peer discovery method. The existing peer updates it related information with the bootstrap node by sending an update message to the peer contact interface 305 of the bootstrap node (1). The peer contact interface 305 forwards the update information to the peer information table module 310 (2), which updates the peer information table. The bootstrap node returns a message to the existing peer via the peer contact interface indicating that the information has been updated (3).

Figure 3E:
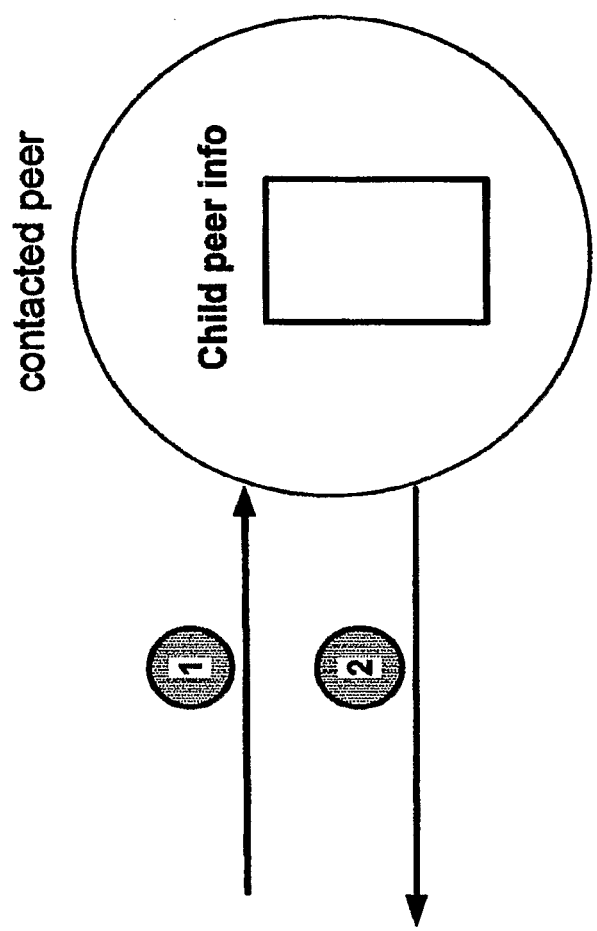
FIG. 3E is a schematic diagram of the detailed operation of the contacted peer of FIG. 3D.

FIG. 3E is a schematic diagram of the detailed operation of the contacted peer of FIG. 3D. The contacted peer (potential parent peer) receives a request from a requesting peer to join it as a child peer (1). The contacted peer examines its child peer information table and determines if the join request can be satisfied with any empty slots that it may have or by preempting one of its current child peers. The contacted peer returns a response indicating the results of its determination to the requesting peer (2).

Figure 4A:
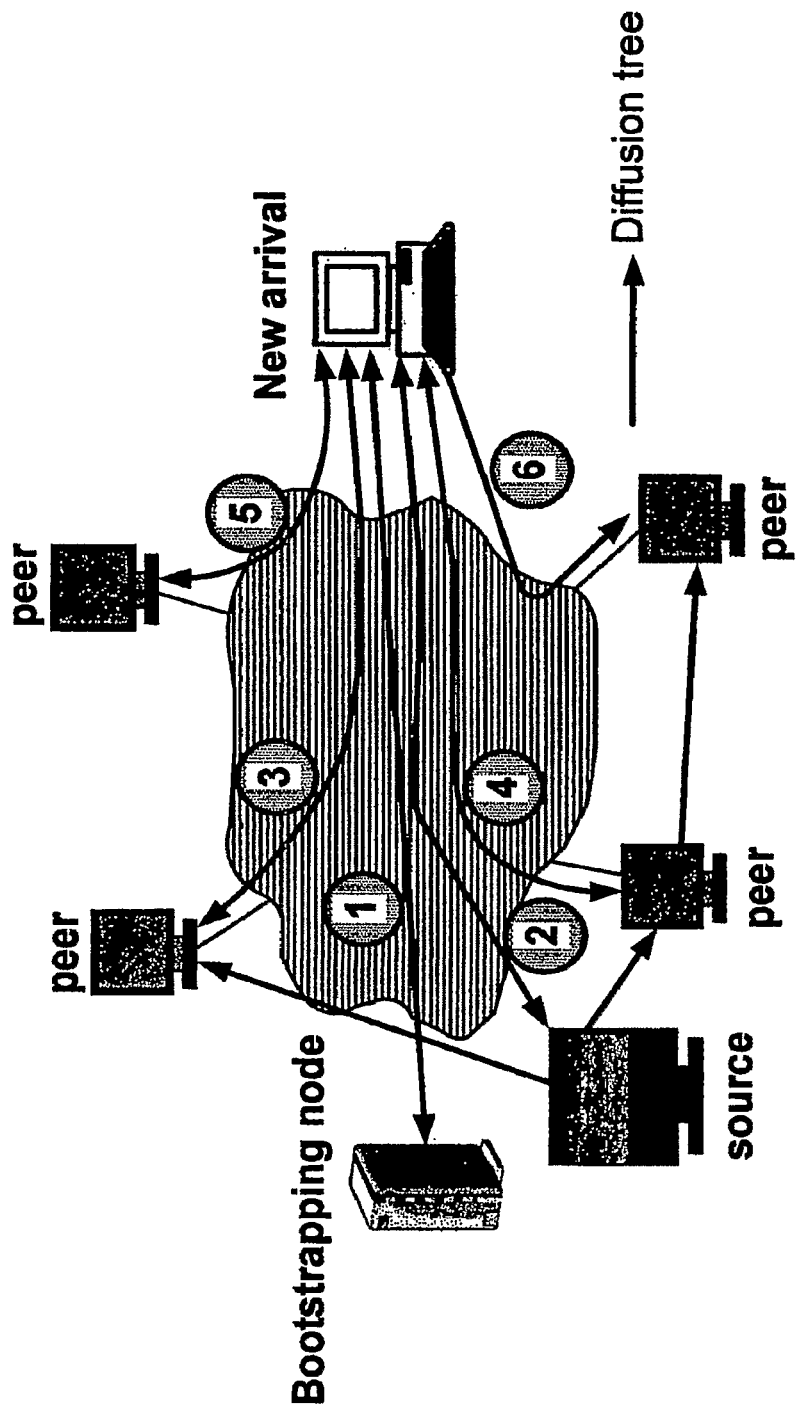
FIG. 4A is a schematic diagram of the distributed method of peer discovery.

Referring now to FIG. 4A, in the distributed discovery approach, the requesting peer contacts the bootstrap node first (1). The bootstrap node returns the address/location of the content source node (1), which is at the root of all diffusion trees. The requesting node maintains a contacting queue, and puts the content source node into the queue and the requesting peer contacts the source node first (2), which returns its child list to the requesting peer (2). The content source node and all peers in the system maintain a table of their child peers in the diffusion tree and their corresponding parameters.

The requesting peer takes one potential parent peer out of the queue each time, and contacts this potential parent peer to see if it can be admitted (3). Each contacted peer returns its child peer list (4). The admission is based on the same policy as described above. If the contacted peer has empty slots, it will admit the requesting peer and the requesting peer becomes the child of this contacted peer, which returns its child peer list to the requesting peer (4). The requesting peer continues in this manner, contacting peers farther down the diffusion tree (5) and subsequently the children of each contacted peer where the requesting peer was admitted (6) until the required number of peers to which the requesting peer can connect are obtained or the list and peers have been exhausted. If the contacted peer does not have empty slots, the policy as set forth in Table 2-A is used to determine if the requesting peer can preempt one of the contacted peer's child peers.

If the requesting peer can preempt on of the contacted child peers then the contacted peer disconnects the child peer that is selected to be preempted and assigns the connection/slot to the requesting peer. Otherwise, the requesting peer is informed that it cannot be admitted. The contacted peer will also return a list of its child peers in the diffusion tree to the requesting peer at the end of process. The requesting peer attaches the returned list to the end of contacting queue. The process continues until either the requesting peer obtains the required number of peers or the list is exhausted. In the latter case, the requesting peer will sleep for a period of time of T and initiate the process described above again.

A third approach is the semi-distributed approach. In order to reduce the signaling overhead, peers maintain some local information about their two-hop away parent peers. Each parent peer piggybacks in content packets the information of its number of empty slots $W_i$, actual contribution $f_i$, and number of excess connections $e_i$ to its child peers.

Further, a parent peer also sends its parent peer's information ($W_i$, $f_i$, $e_i$) to its child peers. Hence a node has the information of its parent peers and grandparent peers.

Figure 4B:
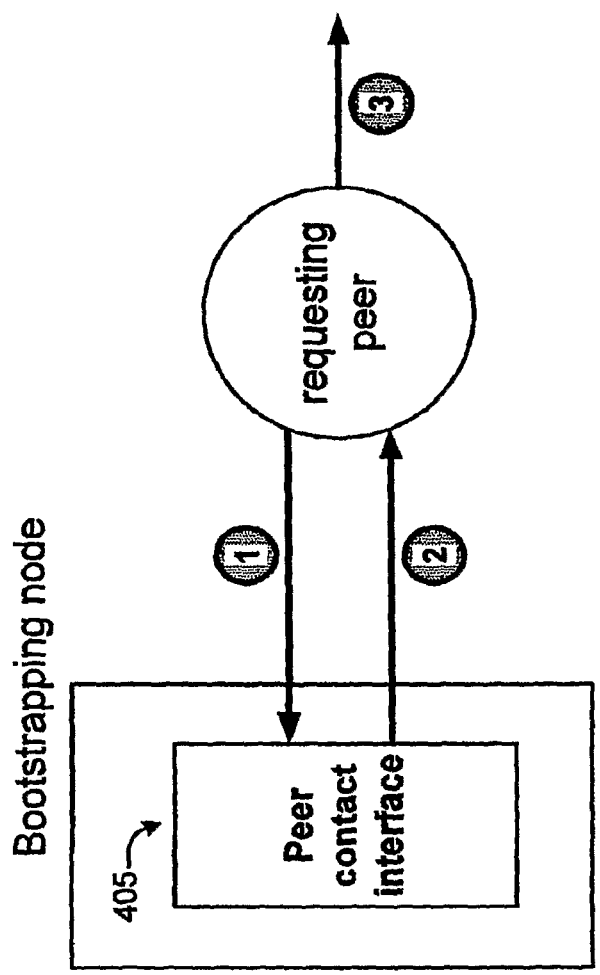
FIG. 4B is a block diagram of the communication between a requesting peer and the bootstrap node in the distributed peer discovery method.

FIG. 4B is a block diagram of the communication between a requesting peer and the bootstrap node in the distributed peer discovery method. The requesting peer sends a join request to the peer contact interface 405 of the bootstrap node (1). The bootstrap node returns the address/location of the content source node (2). The requesting peer contacts the content source node (3).

Figure 4C:
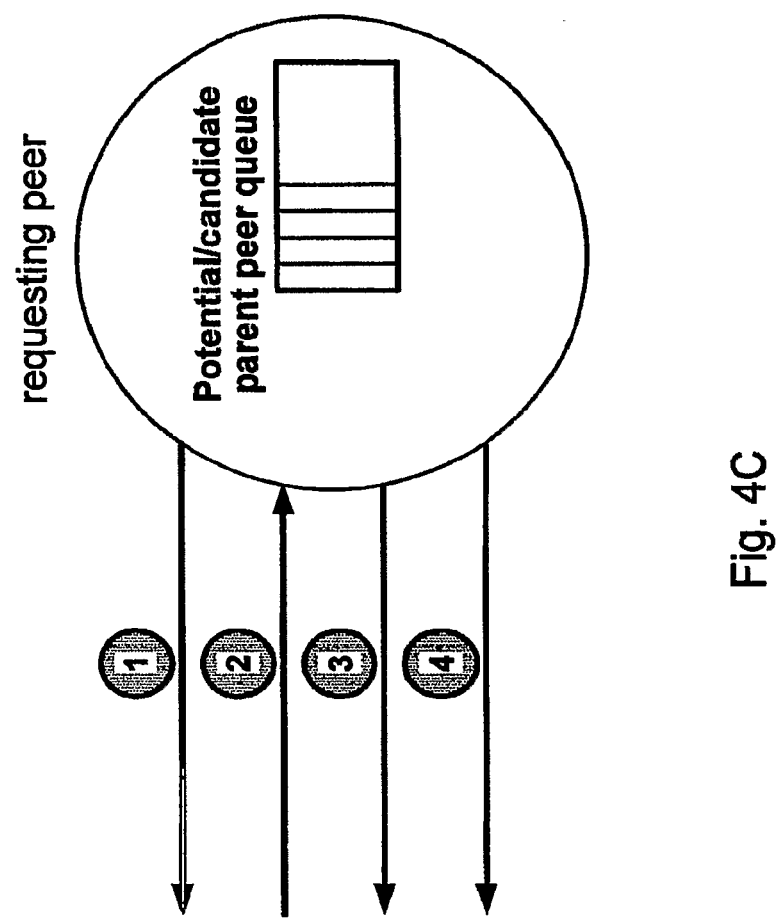
FIG. 4C is a schematic diagram of the detailed operation of the requesting peer of FIG. 4B.

FIG. 4C is a schematic diagram of the detailed operation of the requesting peer of FIG. 4B. The requesting peer contacts the bootstrap node (1). The requesting peer receives the content source node information from the bootstrap node (2). The requesting peer contacts the content source node and receives a list/queue of its child peers which are potential parent peers for the requesting peer (2). The requesting peer stores the returned child peer list at the end of its potential/candidate parent peer queue. The requesting peer then takes each potential parent peer entry from the potential/candidate parent peer queue and contacts it to see if the requesting peer can become its child peer (4). The contacted potential parent peer returns a list/queue of its child peers, which the requesting peer stores at the end of its potential/candidate parent peer queue.

Figure 4D:
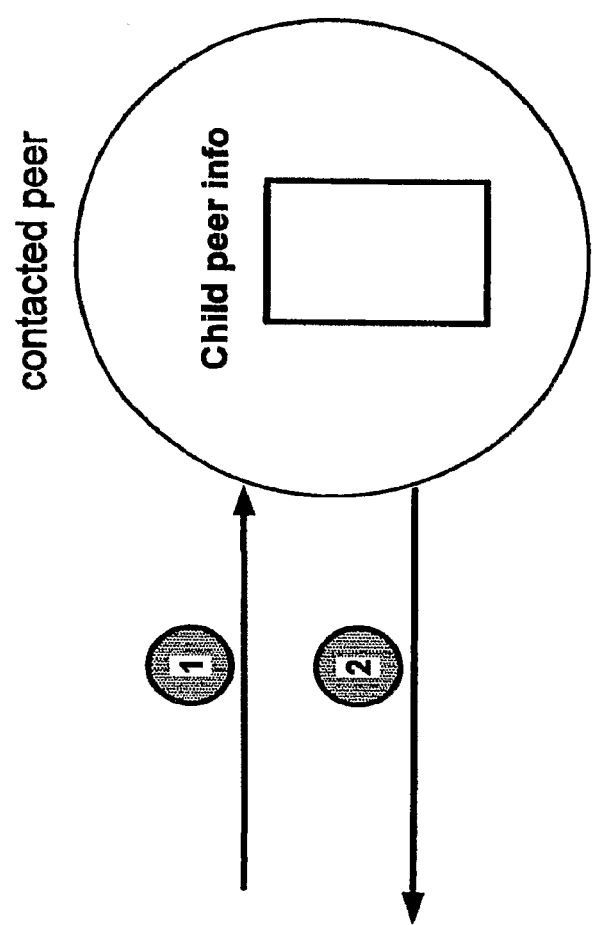
FIG. 4D is a schematic diagram of the detailed operation of the contacted peer of FIG. 4B.

FIG. 4D is a schematic diagram of the detailed operation of the contacted peer of FIG. 4B. Upon receiving the join request from the requesting peer (1), the contacted peer examines its child peer information table and determines if the join request can be satisfied with any empty slots that it may have or by preempting one of its current child peers. The contacted peer returns a response indicating the results of its determination to the requesting peer together with its child peer list (2).

Figure 5A:
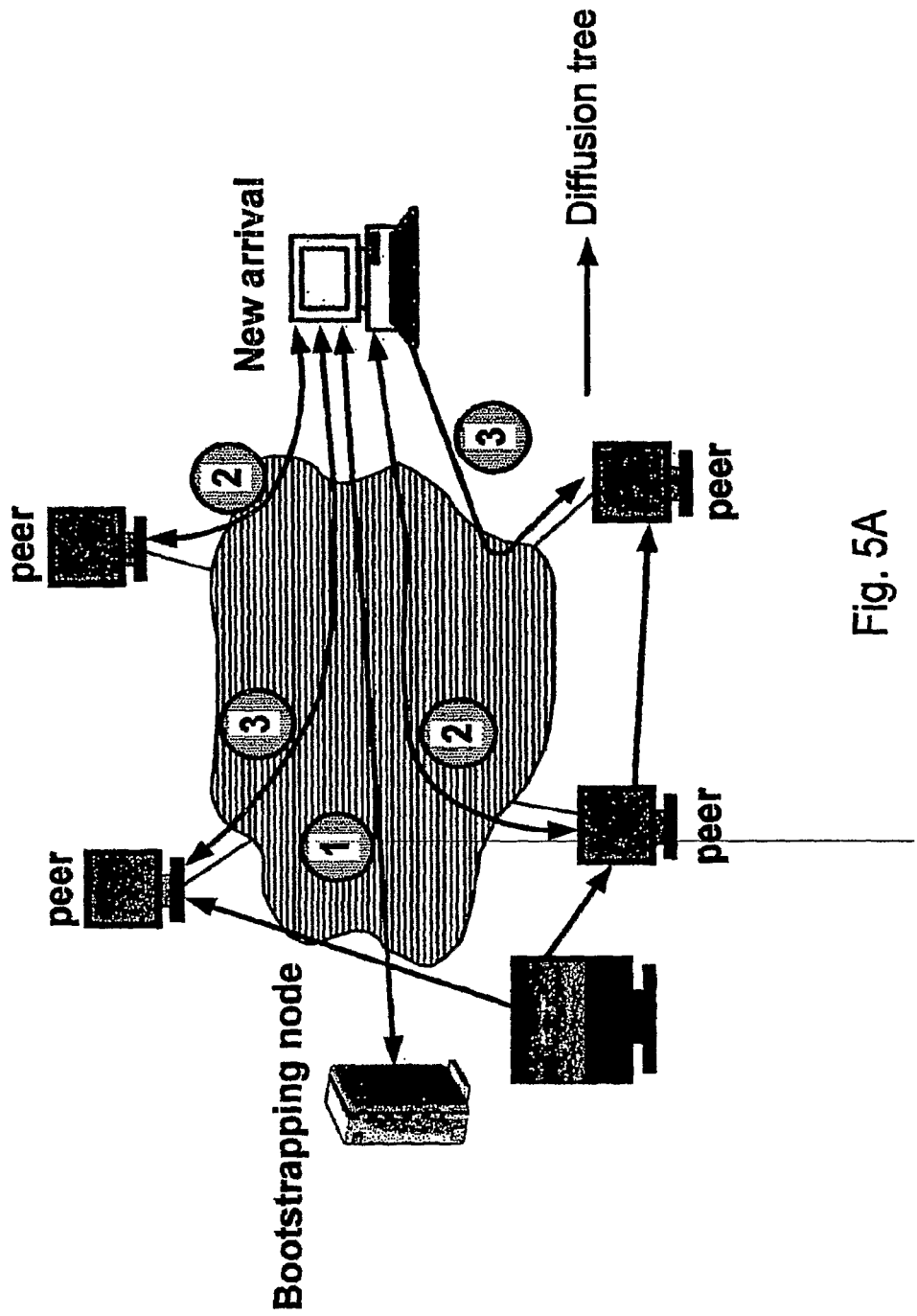
FIG. 5A is a schematic diagram of the semi-distributed method of peer discovery.

Referring now to FIG. 5A, the requesting node contacts the bootstrap node (1) which returns a contacting queue of potential peers (1). Note that the bootstrap node has the list of all peers in the system. However, it does not maintain the table that keeps track of each peer's parameters. The bootstrap node randomly selects a pre-determined number of potential parent peers from the list and returns the list to the requesting node as the contacting queue.

In another embodiment of the invention, the bootstrap node maintains a state table. The state table reflects the condition of a peer's service by the bootstrap node. Upon receiving a request for admission from a requesting peer, the bootstrap node selects a random subset of participating peers that have at least one child that can be preempted. According to one embodiment, appropriate parents are selected by the bootstrap node for inclusion in the state table based on the same preemption policy criteria that are used locally by a parent peer to accept or reject a child peer that is requesting admission.

The requesting node then contacts each peer in the list (2) and receives its neighbor list (2). All these lists are put together to form a single contacting queue. The requesting peer takes one peer off the queue each time, and contacts this potential peer to see if it can be admitted (3). The admission is based on the same policy as described above. If the contacted peer has empty slots, it will admit the requesting peer and the peer becomes the child of this contacted peer. If the contacted peer does not have empty slots, the policy as set forth in Table 2 is used to determine if the requesting peer can preempt one of the contacted peer's child peers.

If the requesting peer can preempt on of the contacted child peers then the contacted peer disconnects the child peer that is selected to be preempted and assigns the connection/slot to the requesting peer. Otherwise, the requesting peer is informed that it cannot be admitted.

The process continues until either the requesting peer obtains required number of peers or the list is exhausted. In the latter case, the requesting peer will sleep for a period of time of T and initiate the process as described above again, FIG. 5B is a block diagram of the communication between a requesting peer and the bootstrap node in the semi-distributed peer discovery method. The peer information table maintains a list of all peers in the system. The requesting peer sends a join request to the peer contact interface 505 of the bootstrap node (1). The peer contact interface 505 then forwards a lookup request to the peer information table module 510 (2). The peer information table module 510 performs the lookup operation on the peer information table and returns a list of randomly selected potential parent peers to the peer contact interface 505 (3). The peer contact interface 505 then returns the list of randomly selected potential parent peers and their peer information to the requesting peer.

Figure 5B:
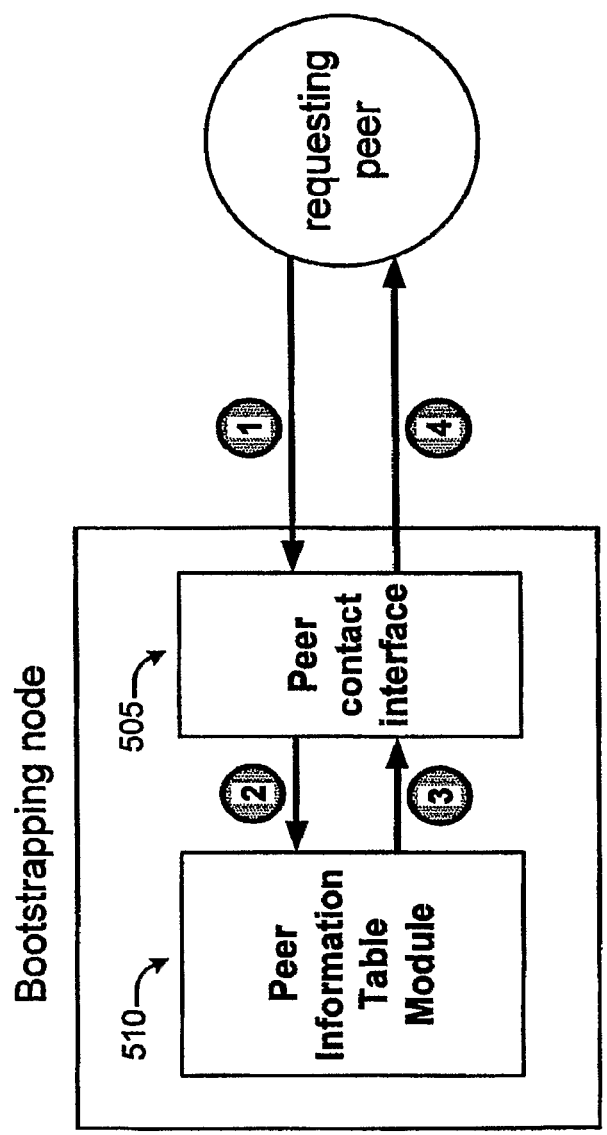
FIG. 5B is a block diagram of the communication between a requesting peer and the bootstrap node in the semi-distributed peer discovery method.
Figure 5C:
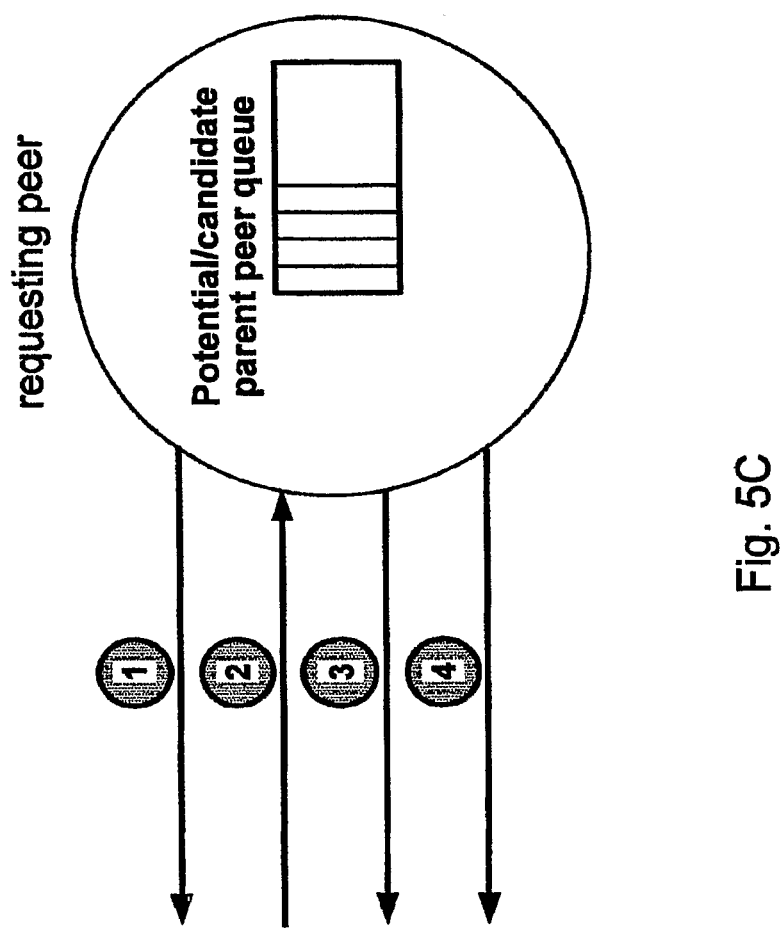
FIG. 5C is a schematic diagram of the detailed operation of the requesting peer of FIG. 5B.

FIG. 5C is a schematic diagram of the detailed operation of the requesting peer of FIG. 5B. The requesting peer contacts the bootstrap node (1). The requesting peer receives the list of randomly selected potential parent peers (2) and stores the randomly selected potential parent peers in its potential/candidate parent peer queue. The requesting peer sequentially contacts the peers in its potential/candidate parent peer queue (3). The requesting peer then sends a message to the contacted (potential parent) peer a neighbor request message (3). Every contacted peer will return a list of its neighbor peers. The requesting peer stores the list of neighbor peers in its potential/candidate parent peer queue. The requesting peer contacts the next potential parent peer on its potential/candidate parent peer queue to see if the requesting peer can become its child peer (4).

Figure 5D:
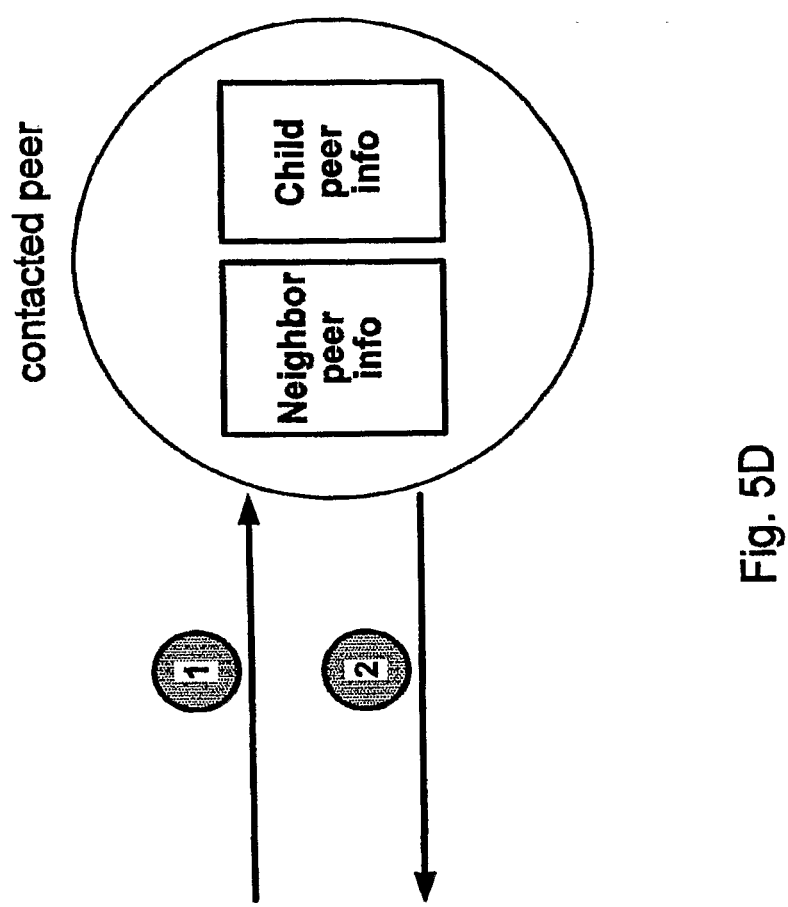
FIG. 5D is a schematic diagram of the detailed operation of the contacted peer of FIG. 5B.

FIG. 5D is a schematic diagram of the detailed operation of the contacted peer of FIG. 5B. A contacted peer, upon receiving a neighbor request message from the requesting node, returns its neighbor peer list to the requesting node (1). If the incoming message is to search for empty slots, the contacted peer examines its child peer information table and determines if the request can be satisfied with any empty slots that it may have or by preempting one of its current child peers. The contacted peer returns a response indicating the results of its determination to the requesting peer (2).

Figure 6:
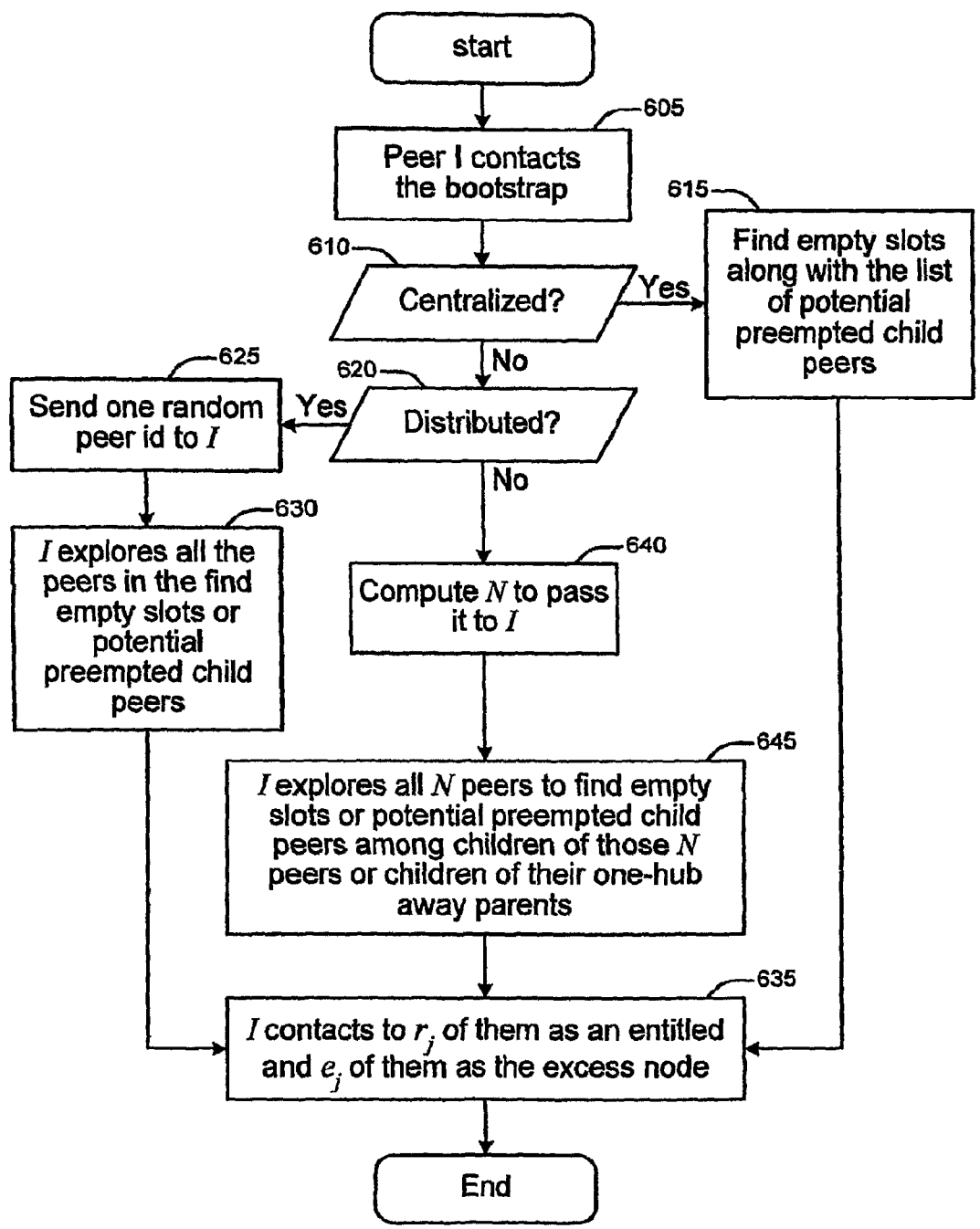
FIG. 6 is a flowchart of the peer discovery process.

Referring now to FIG. 6, which is a flowchart of the peer discovery process. At 605, $p_i$ contacts the bootstrap node. A test is performed at 610 to determine if centralized peer discovery is to be used. If centralized peer discovery is to be used then the empty slots/connections along with the list/queue of potential preemptable child peers is given to $p_i$ by the bootstrap node at 615. Then $p_i$ contacts $r_i$ of the potential peers as an entitled peer and $e_i$ of the potential peers as an excess peer at 635. If centralized peer discovery is not to be used then a test is performed at 620 to determine if distributed peer discovery is to be used. If distributed peer discovery is to be used then the identification (id) of a list/queue of random peers is given to $p_i$ at 625. At 630 $p_i$ explores all peers in the list/queue of peers with empty slots/connections and the potentially preemptable peers.

Thereafter, $p_i$ contacts $r_i$ of the potential peers as an entitled peer and $e_i$ of the potential peers as an excess peer at 635. If distributed peer discovery is not to be used then by default, semi-distributed peer discovery is to be used. At 640 the number of peers in the network, N, is given to $p_i$. Then at 645 I explores all N peers to find empty slots or potentially preemptable child peers among children of those N peers or children of the potential peers that are one hop away from $p_i$. Then $p_i$ contacts $r_i$ of the potential peers as an entitled peer and $e_i$ of the potential peers as an excess peer at 635.

Note that the present invention may have longer startup delay/latency than traditional non-contribution-aware peer-to-peer streaming schemes. The process of locating parent peers contributes to the longer startup delay. Also, different peer discovery schemes cause different latency. The centralized peer discovery and semi-distributed peer discovery schemes incur shorter startup/joining latency than the distributed peer discovery scheme, which traverses the diffusion trees starting from the root. However, since the contribution-aware peer-to-peer live streaming method of the present invention uses MDC (multiple description coding) to encode the underlying data, a peer can start the playback whenever it receives the first description. This can potentially shorten the startup latency.

The peer preemption policy can lead to extra peer churning in present invention. For instance, if a requesting peer preempts a child peer that is already connected to a parent peer, the preempted child peer has to try to join another parent peer, thus, adding extra churning to the system. This process may continue until a preempted child peer finds an empty slot for itself with another parent peer.

If a connection being preempted is "excess connection", this has less impact since the peer is not deemed to have this connection in the first place. One way to mitigate this problem is to modify the preemption policy. The preemption policy of the present invention does not allow an "entitled connection" to preempt another "entitled connection". Also, the churn effect may not be as serious since MDC (multiple description coding) is used to encode the stream data. If a peer loses some descriptions, the viewing quality will degrade, however, the stream is still viewable.

Next, the contribution aware mechanism is described in the context of mesh-based P2P streaming. While the described mechanism is primarily inspired by the similar scheme for tree-based P2P streaming approach in the prior art, there are some notable differences. In the tree-based approach, a particular description of the content is delivered through each tree. Therefore, each peer should join a proper number of trees and also serve as an internal node in only one tree. This approach raises a few issues that do not exist in mesh-based streaming as follows:

First, to improve its received quality in a tree-based approach, each peer should find a parent in a new tree whereas in a mesh-based approach any new peer can serve as a parent. Second, the local preemption policy for tree-based approach should distinguish between entitled connections for contributor versus non-contributor peers. This, in turn, adds new scenarios that should be addressed by the policy. Third, in tree-based approaches each connection should be specifically labeled as entitled or excess.

In contrast, in the mesh-based approaches of the present invention, the number (rather than identity) of excess connections is simply determined by the difference between the actual number of connection and the number of entitled connection for each peer (i.e., $e_i = a_i - R_i$ when $a_i > R_i$).

Another important difference between the approach of the present invention and the tree-based approach is the use of peer's willingness ($W_i$) instead of its actual contribution ($f_i$) to determine its entitled incoming degree in equation (1) and (2). Given that the actual contribution of each peer is always less than its willingness (i.e., $f_i < W_i$), using the actual contribution has two side effects: (i) the available resources in the system is underestimated in the second term of equation (1) and (2)

$$\left(i.e., \sum_{i=1}^{N} f_i \le \sum_{i=1}^{N} W_i\right).$$

This, in turn, leads to a more conservative behavior by individual peers during the parent discovery process. (ii) the actual contribution of peer i depends on the ability and demand of other participants to use its outgoing bandwidth. (iii) effective churn (i.e., departure of a child peer) results in a transient drop in $f_i$ which leads to more dynamics in the system. Examinations have shown that, in various embodiments, this approach will slow down parent discovery and is inappropriate in a dynamic environment where peer population (and thus available resources) is constantly changing.

The generic cost function/tax function described above regulates operation of peer admission. By selection of t parameters of this function, the characteristics of various embodiments of the invention can be determined. As such in various embodiment exhibit different behavior of the cost function/tax function (i.e., equation (1)) as well as the impact of main parameters on its behavior (e.g., $W_i$) as the tax rate (t) changes. Understanding the behavior of the tax/cost function allows a determination of how individual peers determine their incoming degree across the parameter space, which is very useful in evaluating the performance of the contribution aware mechanism.

Figure 7A:
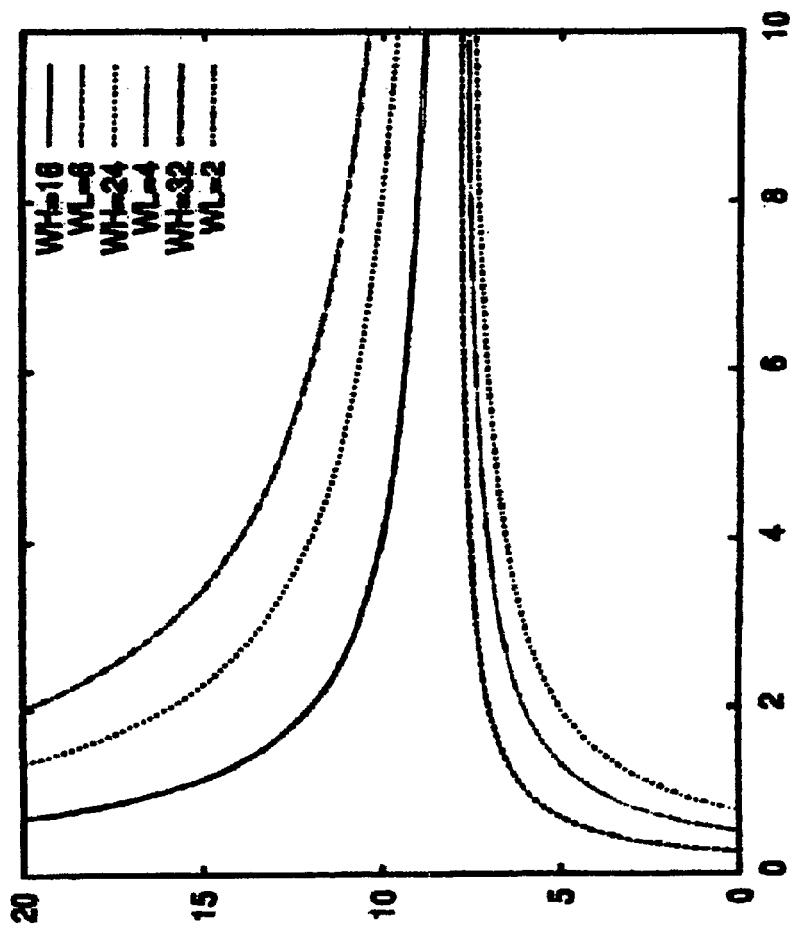
FIG. 7A is a graphical representation of a basic cost factor/tax rate function according to embodiments of the invention.
Figure 7B:
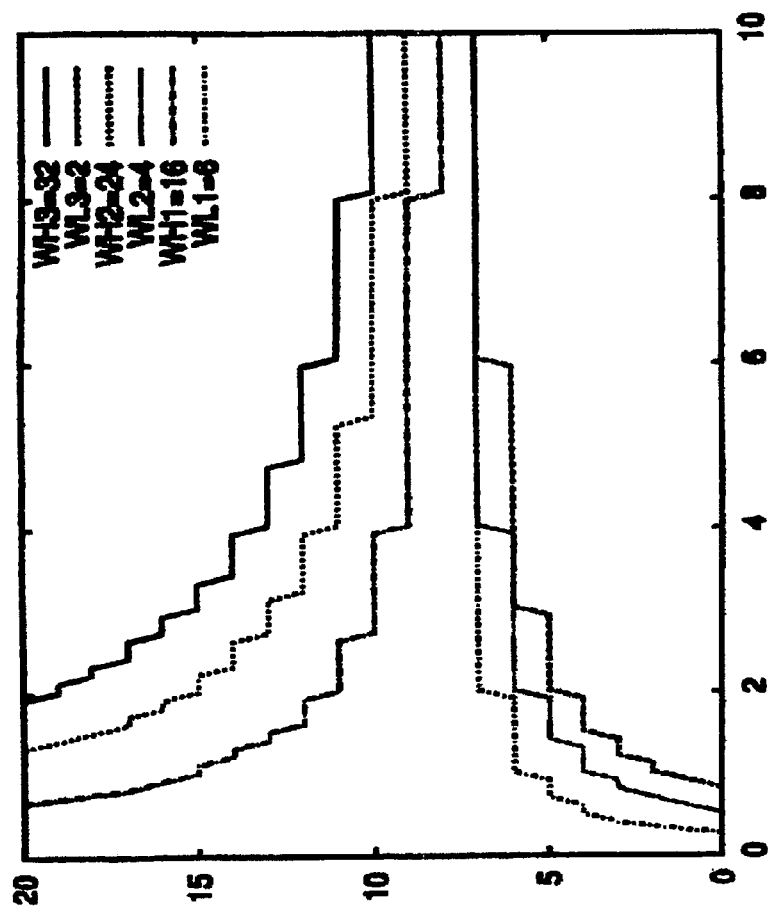
FIG. 7B is a graphical representation of a tax rate/cost factor including flooring according to embodiments of the invention.
Figure 7C:
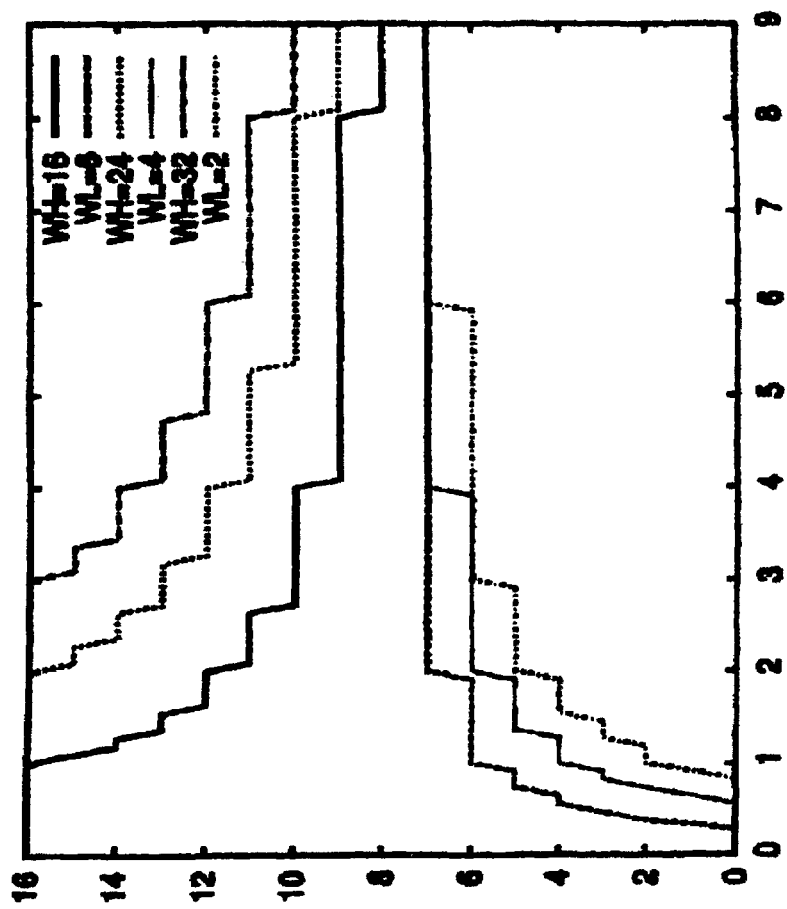
FIG. 7C is a graphical presentation of a tax rate/cost factor function considering flooring and saturation according to embodiments of the invention.

FIGS. 7A-7C illustrate the behavior of a tax function/cost function with different values of $W_i$, according to various embodiments of the invention when the resource index (RI) is 0.5 and Max is 16.

Given group of N peers and their level of willingness to contribute ($W_i$), RI of a scenario as defined as the ratio of available resource ($\Sigma W_i$) to the aggregate demand for resources. In various embodiments, it is assumed that all peers have sufficient incoming bandwidth to receive full quality stream, the aggregate demand for resources can be simply determined as N*Max. Therefore, the value of RI in a given scenario is $$RI = \frac{\sum W_i}{N * \text{Max}} \quad (4)$$

This definition can be substituted into equation (1) and the equation can then be rewritten as follows:

$$R_i(t) = \frac{1}{t} W_i + \frac{t-1}{t} RI * \text{Max} \quad (5)$$

Equation (5) represents the entitled degree of a peer i as a function of tax rate t based on the following parameters: peer's willingness ($W_i$), resource index in the overlay (RI) and maximum degree (based on stream bandwidth) Max. FIG. 7A plots $R_i(t)$ as a function of t for different values of $W_i$ when RI=0.5, RI*Max=8. This figure reveals some important properties of the tax function and its dependency to different parameters as follows:

First, as the tax rate increases, the entitled degree of all peers converges to the same value of RI*Max regardless of its initial value. For high bandwidth peers ($W_i$>RI*Max), the entitled degree is gradually decreasing with tax rate whereas for low bandwidth peer ($W_i$<RI*Max) the entitled degree is gradually increasing with tax rate. One of ordinary skill in the art will note that as t increases the first term in the equation rapidly decreases and the second term converges to RI*Max.

Second, the rate of change in the entitled degree as tax rate increases depends on the peer's willingness (or $W_i$). A larger value of $W_i$ leads to a faster convergence as shown in FIG. 7A.

Third, the value of RI*Max determines the final value for the entitled degree of all peers. Therefore, changing the availability of resources or stream bandwidth simply shifts the converging value in this figure up or down accordingly.

Fourth, as indicated above, the floor ($R_i$) value from equation (5) is used to prevent over-estimating the available resources. FIG. 7B depicts floor ($R_i$) from equation (5). It illustrates how the floor ($R_i$) operation affects the evolution of entitled degree as a function of tax rate/cost factor for different values of $W_i$.

Fifth, as noted above, a peer can be saturated when its entitled degree is larger than the maximum degree that is required for receiving full quality stream, i.e., Max≤$R_i$. According to one exemplary embodiment in which 80% of peers have high-bandwidth and the balance of peers have low bandwidth, the required incoming degree to receive a full quality stream is eight and, the degrees of willingness for high and low bandwidth peers are 24 and 4 respectively. In another embodiment of the invention, high and low bandwidth peers contribute 40 and 4 outgoing connections respectively. The actual degree of a saturated peer is limited to Max. FIG. 7C depicts the behavior of tax function/cost function when some peers high bandwidth peers are becoming saturated. One of skill in the art will appreciate that it is important to determine whether (and fraction of) peers become saturated in a given scenario because this affects (i) their received quality, and (ii) the amount of excess resources in the system. That is, FIG. 7C represents the behavior of tax function/cost function in a static system where the peer population and the available resources are fixed and known, i.e., the reference static scenario. In practice, because of the dynamics of peer participation and the resulting variations in available resources, the reported group state to individual peers is not perfectly accurate. Therefore, the average behavior among participating peers could be different from the above reference case. Below various scenarios are examined and compared compare with corresponding reference static scenarios to identify the underlying causes that lead to the observed differences.

It has been shown that, in various embodiments, a peer can quickly increase its incoming degree from zero to reach its entitled degree. In at least one embodiment, high-bandwidth peers can achieve entitled degree in less than 20 seconds while low bandwidth peers can achieve entitled degree in 11 seconds. In one embodiment, all peers reach their target incoming degree in approximately 60 seconds. According to one embodiment, peers having a lifetime of less than 60 seconds do not achieve entitled incoming degree. In various embodiments, once the incoming degree of peer reaches entitled degree, the incoming degree of that peer tends to oscillate around the entitled degree value due to minor changes in available resources and variations in the number of excess connections.

The behavior of various embodiments of the invention has been evaluated through simulation. The evaluation methodology is used to examine the behavior of the proposed contribution aware mechanism, where an exemplary mechanism is incorporated into a mesh-based P2P streaming mechanism, designated as PRIME. The delivered quality to individual peers in a mesh-based P2P streaming mechanism depends on
(i) their ability to maintain a proper number of parents as peers leave/join the system, and
(ii) the behavior of content delivery mechanism among participating peers through the resulting overlay.

The connectivity between individual peers and their parents in the overlay is apparent. According to various embodiments, the contribution aware mechanism primarily affects the connectivity among peers by introducing both the parent selection strategy and child preemption policy. While the connectivity and dynamics of the overlay is likely to have an impact on the performance of the content delivery, this effect does not illustrate the performance of the contribution-aware mechanism, but rather shows the ability of PRIME to cope with overlay connectivity and dynamics. Focusing on the effect of contribution-aware mechanism on the overlay connectivity also allows an abstraction out of packet level dynamics and simulations with larger group size.

The following evaluations of various embodiments of the invention have been prepared using a P2P session-level simulator, called psim. Psim is an event-driven simulator that incorporates pairwise network delay between participating peers. Furthermore, psim provides a realistic model for churn by using a log-normal distribution (with µ=4.29 and σ=1.28) for peer session time and Pareto distribution (with a=2.52 and b=1.55) to model the peer inter-arrival time as reported by prior empirical studies on deployed P2P streaming systems. By abstracting out packet level dynamics, psim enables simulation scenarios with a large number of peers, or high degree of dynamics in peer participation. Three groups of performance metrics are used to capture different aspects of performance for the contribution aware mechanism.

Both the incoming and outgoing degree of each peer changes during a session. Accordingly, the weighted incoming and outgoing degrees are used to capture the effective degree that is observed by each peer. The weighted incoming or outgoing degree is the average value of degree that each peer experiences for different intervals during a session where each degree value is weighted by the interval of time while that degree is maintained. For example, if a peer has an outgoing degree of 3 for half of its session and 5 for another half, its weighted outgoing degree is 4.

The weighted incoming and outgoing degrees of each peer quantify its usage of and contribution of the resources during the session. The weighted average incoming degree of a peer is further divided into weighted average entitled and excess degree.

This metric also captures how well the contribution aware mechanism can utilize the outgoing bandwidth of participating peers and is defined as the ratio of aggregate weighted outgoing degree across all peers to the maximum outgoing degree across all peers. Two metrics are used to capture the degree of changes in the overlay as follows:
  (i) the average time between consecutive loss of a parent, and
  (ii) the percentage of stable peers that are identified as peers whose observed time between consecutive changes in parents is at least 600 seconds.

Observed changes in parents are divided into two groups: changes due to parent departure versus changes due to preemption by other child peers. Overhead is captured for all signaling messages associated with the contribution-aware mechanism in terms of message (or byte) per peer per second.

The impact of each one of the following factors on the performance of an exemplary contribution-aware mechanism according to the invention is evaluated below:
  (i) Dynamics of parent disconnections,
  (ii) Benefits of contribution-aware mechanism,
  (iii) Effect of tax rate/cost factor and peer contribution
  (iv) Resource index (RI) in the system,
  (v) Scalability with group size, and
  (vi) Effect of update frequency.

The reported results for each simulation are averaged across multiple runs with a different random seed. The following default parameters are used in the illustrative exemplary simulations provided here: Stream rate=400 Kbps, group size=500 peers, access link bandwidth for high and low bandwidth peers are 1 Mbps and 100 Kbps, respectively. In other exemplary embodiment, a stream rate of 600 Kbps is employed. The value of bandwidth-per-flow or bwpf (i.e., the ratio of bandwidth to degree for each peer) is set to 50 Kbps. In all simulations a realistic churn model is incorporated, which has a log-normal distribution (with $\mu=4:29$ and $\sigma=1.28$) for peer session time and Pareto distribution with (a=2:52 and b=1:55) to model the peer inter-arrival time. The churn model is derived from recent empirical studies on deployed P2P streaming system. The state collection and reporting is performed once every 10 seconds. Each simulation is run for 6000 seconds and information is collected during the steady state when the population reaches the desired target. In one embodiment of the invention, a connection between a long-lived parent-child remains intact as long as the aggregate resources do not change. In another embodiment of the invention, increasing an update interval results in a significant drop in entitled degree with a corresponding small increase in excess degree.

Figure 8A:
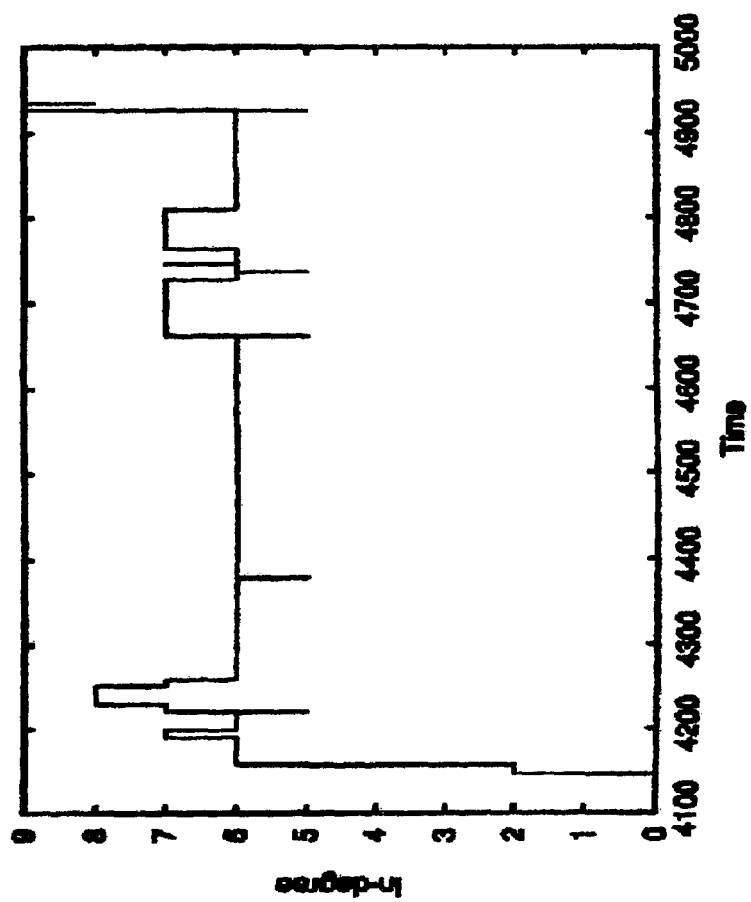
FIG. 8A is a graphical representation of variation of incoming degree for a typical low contributor according to embodiments of the invention.
Figure 8B:
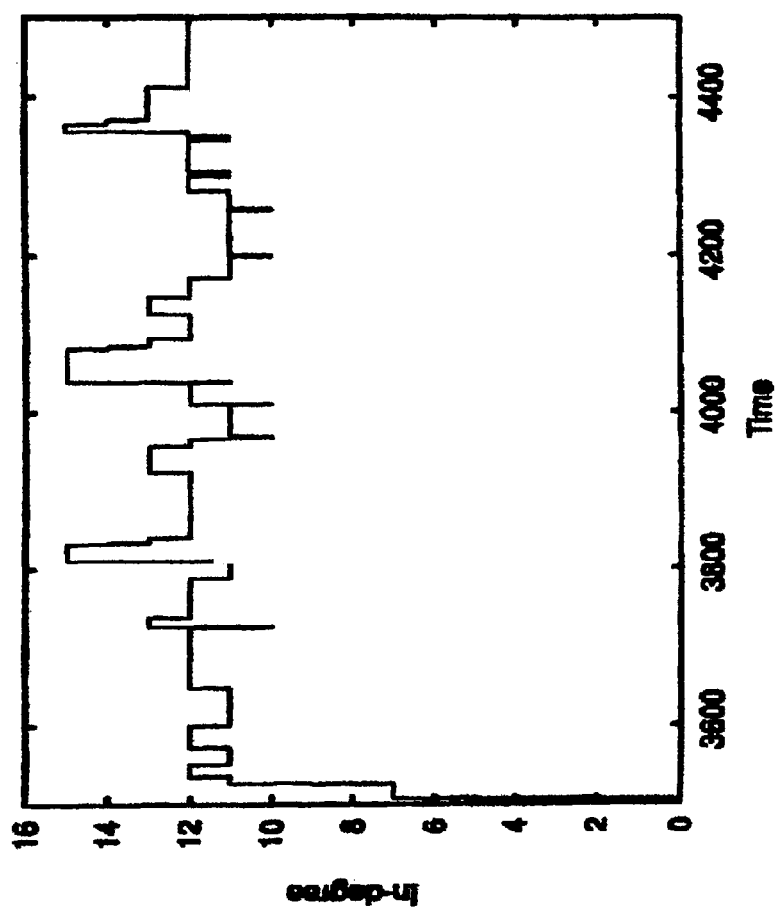
FIG. 8B is a graphical representation of variation of incoming degree for a typical high contributor according to embodiments of the invention.

FIGS. 8A and 8B show, according to one embodiment, the incoming degree of a typical low and high contributor during its life time, respectively. The tax rate/cost factor is set to 4 and high contributors' outgoing degree is 24 while low contributors' outgoing degree is 4. In this scenario, high contributors are entitled to 11 and low contributors are entitled to 6. As a typical behavior a peer starts with zero and reaches to its entitled number of parents in a short time (in less than 20 sec for a high contributor and 11 sec for a low contributor). As shown in FIG. 8A the peer may increase it's incoming degree and get some excess connections, although these excess connections are not stable and upon demand may be preempted by other entitled connections.

Figure 8C:
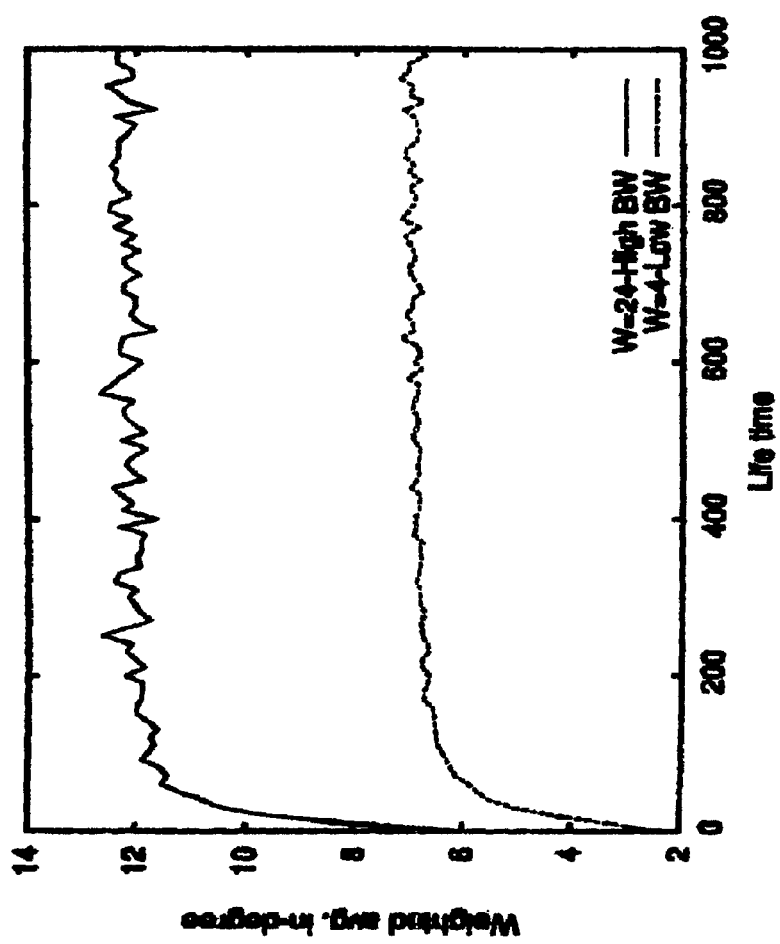
FIG. 8C is a graphical representation of average incoming degree of peers based on their lifetime according to embodiments of the invention.

One of ordinary skill in the art will appreciate that peers rapidly increase their degree one average. To illustrate this, the weighted average degree across peers with a life time within a 10 second interval is shown. FIG. 8C shows the average incoming degree of peers with different life time.

Weighted average (incoming or outgoing) degree of a peer represents its effective average degree by weighting each degree by the interval that a peer maintains that degree. For example, if a peer has an outgoing degree of 3 for one fourth of its session time and 5 for the rest of its session time, its weighted outgoing degree is 4.5. According to one embodiment of the invention, the weighted incoming and outgoing degree of each peer quantify the utilization and contribution of the resources during a session, respectively. In various embodiments, weighted average incoming degree is included in the weighted average entitled degree and the weighted average excess degree.

As is evident in FIG. 8C, exemplary peers with life time less than 50 msec do not remain in the system long enough to receive an average number of incoming connections based on their entitled connections.

The benefits of contribution aware peer-to-peer admissions, according to various embodiments of the invention are examined with respect to the effect of the contribution-aware mechanism on the distribution of resources among participating peers in a group that consists of 80% low and 20% high bandwidth peers. The tax rate/cost factor is 2 and high bandwidth peers contribute up to 24 while low bandwidth peers contribute up to 4 connections. All other parameters are their default values.

Figure 9A:
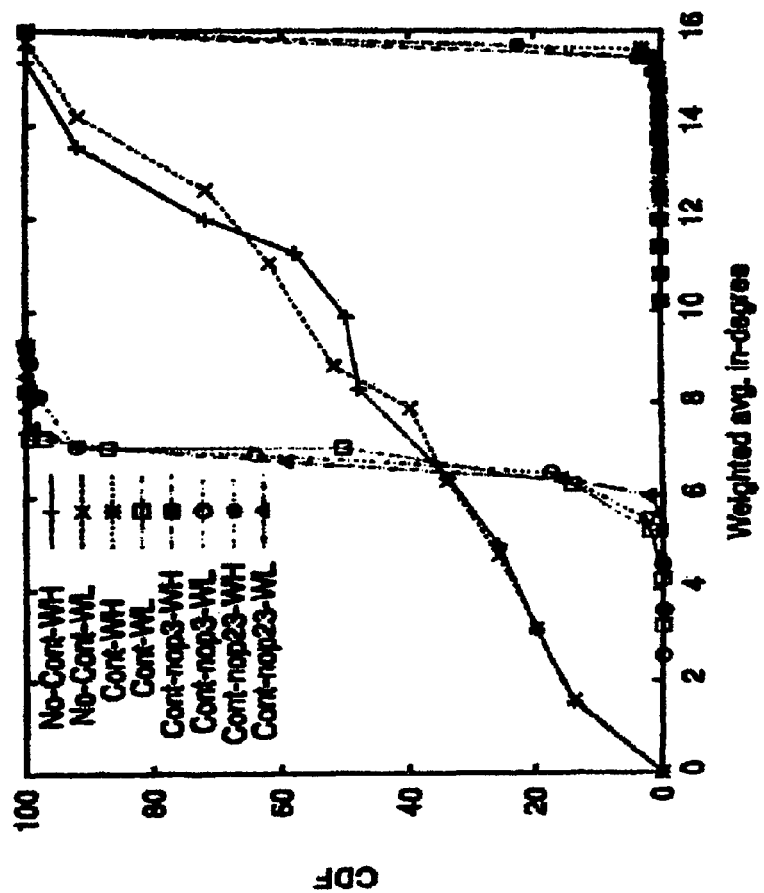
FIG. 9A is a graphical representation of distribution of weighted-average in degree for a tax value/cost factor of two according to embodiments of the invention.

FIG. 9A depicts the cumulative distribution function (CDF) of weighted average incoming degree among high and low bandwidth peers when tax rate/cost factor is 2, with contribution-aware mechanism (labeled as Cont.*) and without contribution-aware mechanism (labeled as No-Cont.*). This figure shows that, in the absence of the contribution-aware mechanism, the distributions of incoming degree for high and low bandwidth peers are similar, and thus, the allocation of resources does not depend on the contribution of participating peers. In contrast, the degree distribution for high and low bandwidth peers are clearly separated and within each group have a rather uniform, i.e., all low bandwidth peers have a degree close to 6 whereas the degree of all high bandwidth peers is very close to 15.

To quantify the importance of different preemption policies, two other scenarios are illustrated where no preemption occurs in the Ex-Ex and En-En scenarios. FIG. 9A depicts the CDF of degree distribution for both high bandwidth and low bandwidth peers in these two scenarios. The results indicate that enforcing Ex-Ex and En-En preemption scenarios do not appear to cause any improvement in the performance in terms of the distribution of weighted average incoming degree. In other words, the En-Ex policy is sufficient to achieve a good performance.

Figure 9B:
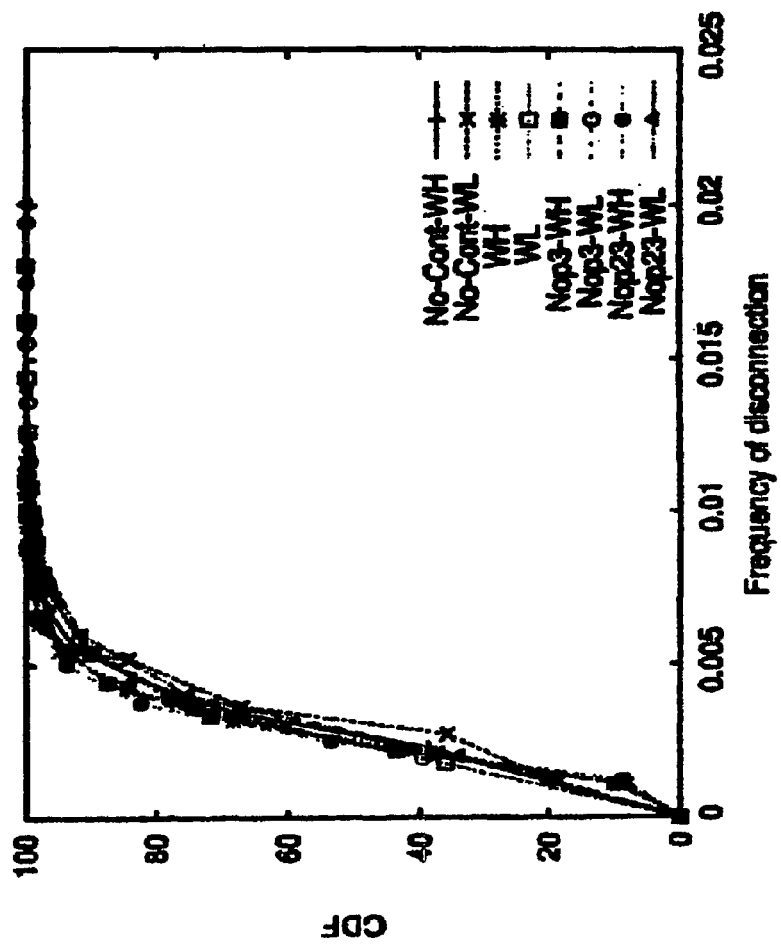
FIG. 9B is a graphical representation of average parent disconnection rate due to churn according to embodiments of the invention.

FIG. 9B depicts the distribution of the average rate of observed disconnections by individual peers due to churn. Since the rate of disconnection due to churn for each peer is directly proportional to its incoming degree, a normalized value is presented in FIG. 9B, which illustrates that the distribution of average disconnection rate due to churn does not depend on peer bandwidth and does not change with the contribution-aware mechanism.

Figure 9C:
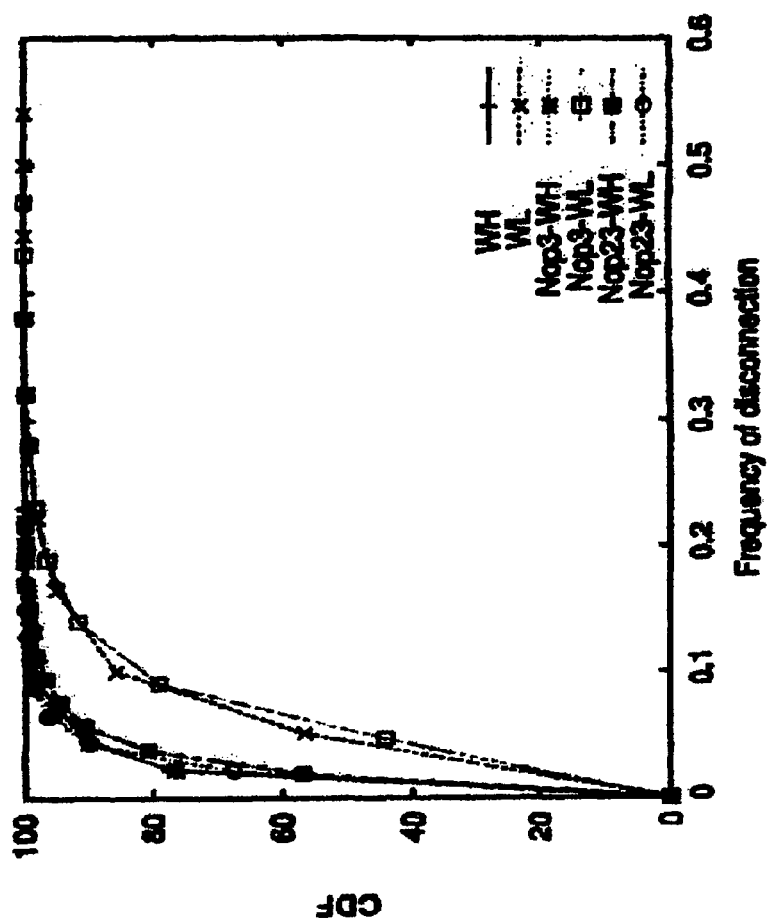
FIG. 9C is a graphical representation of average parent disconnection rate due to preemption according to embodiments

FIG. 9C presents the distribution of the average rate of parent disconnections among participating peers among high and low bandwidth peers in the base scenario as well as the scenarios in which both Ex-Ex and En-En are disabled. This figure shows that low bandwidth embodiment of peers observe a higher rate of preemption in the base case. This condition persists even after disabling En-En preemption policy. However, in all other cases, the observed disconnection rate is similar. Note that in this parameter setting high bandwidth peers' connections are entitled therefore they do not observe major preemption.

Comparison of FIG. 9B and FIG. 9C reveals that the rate of parent disconnections due to preemption is roughly 20 times higher than the parent disconnection due to churn. In other words, the preemption policies significantly increase the overall rate of disconnection beyond the observed rate due to churn alone. It should be noted that normalizing the rate of disconnection due to preemption in FIG. 9C is not meaningful since the observed rate depends on the relative number of excess degree for each peer.

TABLE 3

PERCENTAGE OF STABLE PEERS

| Scenario | Any Disconnect | Due to Churn | Due to Preemption |
|---|---|---|---|
| Reference | 1.5% | 29% | 2% |
| Ref. w/o En-En | 3.2% | 29% | 5% |
| Ref. w/o Ex-Ex and En-En | 24% | 29% | 51% |
| w/o contribution-aware | 29% | 29% | 100% |

Table 3 depicts the group-level view of stability by showing the percentage of peers whose observed time between consecutive disconnections (regardless of their cause) is at least 600 seconds. Each row of the table represents different scenario with contribution-aware mechanism (including various combination of preemption policies) and without it.

Table 3 shows that in the absence of contribution aware mechanism only 29% of peers are stable. Using the contribution-aware mechanism with only En-Ex and Ex-En policies slightly reduces the percentage of stable peers to 24%. However, adding any other policy leads to a significant reduction in the percentage of stable peers. Since the En-En and Ex-Ex policies significantly increase the instability of the overlay without affecting the performance of the contribution-aware mechanism, these policies are eliminated in the embodiments presented in the remaining evaluations.

Next, various embodiments of the invention are examined with respect to changes in the behavior of a contribution-aware mechanism with the key parameters that determine a scenario:

(i) the value of tax rate/cost factor t which is a configuration parameter, and (ii) the value of peer's willingness to contribute ($W_i$).

The following description assumes that Max=16, resource index (RI) is 0.5, bwpf=50 Kbps with 500 peers that consists of 80% low bandwidth and 20% high bandwidth peers. One of ordinary skill in the art will see that three different scenarios are presented for outgoing bandwidth of high and low bandwidth peers (along with their corresponding contribution $W_i$ as the ratio of their outgoing degree to bwpf) as follows:

Scenario S1: 800 Kbps and 300 Kbps ($WH_1$=16, $WL_1$=6)
Scenario S2: 1.2 Mbps and 200 Kbps ($WH_2$=24, $WL_1$=4)
Scenario S3: 1.6 Mbps and 100 Kbps ($WH_h$=32, $WL_1$=2)

It should be noted that here, $WH_i$ and $WL_i$ denote the contribution of high and low bandwidth peers, respectively. Note that while the aggregate amount of resources (or RI) remains constant across these three scenarios, the level of bandwidth heterogeneity significantly varies among them, which, in turn, determines the distribution of maximum outgoing degree among peers. Therefore, examining the performance of the system across these scenarios reveals how the distribution of $W_i$ among peers affect system performance.

Figure 10A:
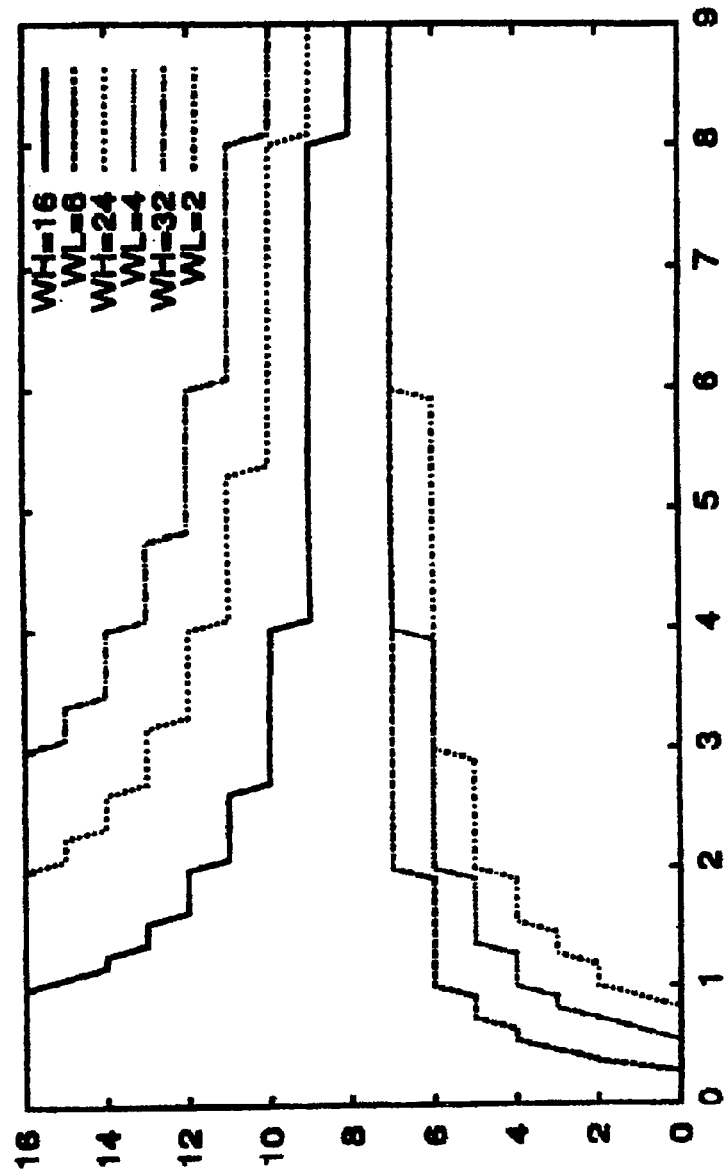
FIG. 10A is a graphical representation of the invention of computer entitled connections, rounded down according to embodiment of the invention.
Figure 10B:
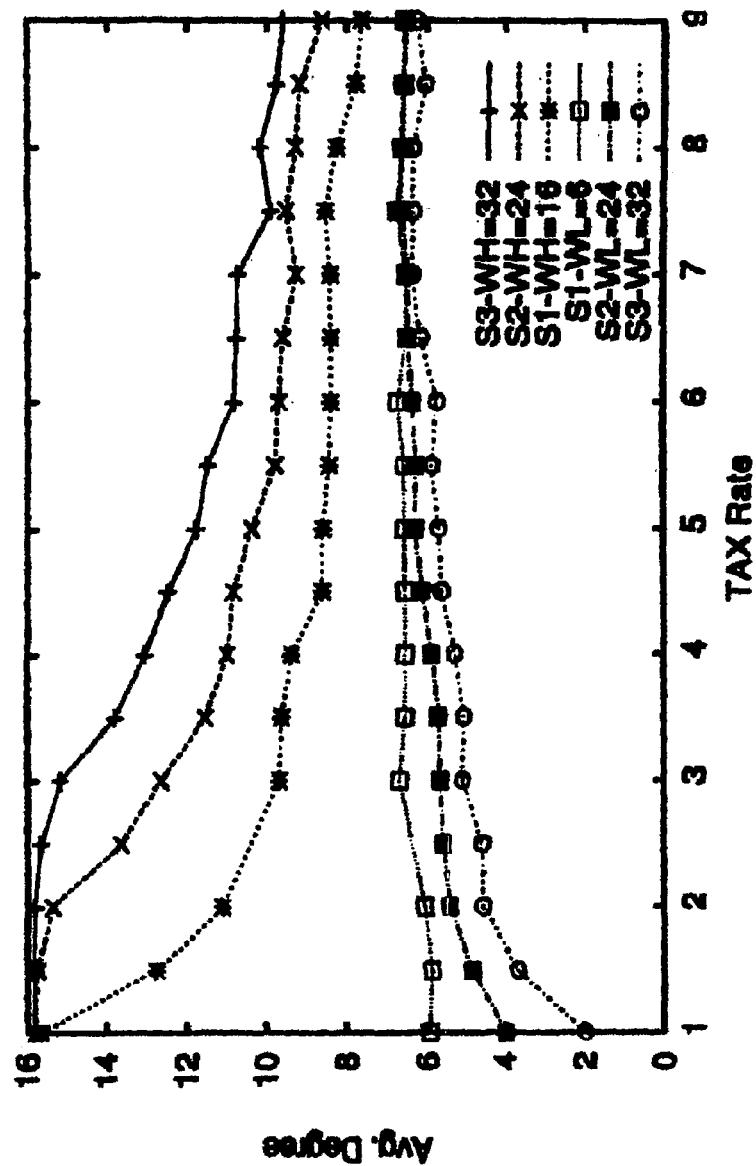
FIG. 10B is a graphical representation of entitled peer weighted-average according to embodiments of the invention.

FIG. 10A depicts the entitled degree of high and low bandwidth peers in all three scenarios with different tax rate/cost factor values based on equation (2) as a reference. FIG. 10B shows the weighted average entitled degree among high and low bandwidth peers in all three scenarios as a function of tax rate/cost factor in the simulations. Comparing these two figures shows that interestingly the weighted average entitled degree among high and low bandwidth peers closely follows its estimated values by equation (2) despite the existing dynamics in the connectivity among peers. In one embodiment of the invention, except for very small tax values, the average value of entitled and total degrees are substantially similar. In an exemplary inventive aspect, when the cost factor/tax rate is small, the entitled degree of high bandwidth peers becomes saturated and high bandwidth peers do not require excess connections.

In one embodiment, saturated peers do not use their entitled degree, excess resources become available in the system and the amount of excess resources is proportional to ($Ri_h$-Max). Low bandwidth peers can utilize these excess resources to form excess connections. In one embodiment of the invention, as long as high bandwidth peers are not saturated, the average excess degree for both high and low bandwidth peers is substantially the same, and is substantially insensitive to changes in the tax rate/cost factor and the distribution of peer contributions. In one embodiment, the contribution-aware mechanism substantially evenly divides excess resources among participating peers. In a further embodiment, the heterogeneity of contributed resources by high and low bandwidth peers is proportionally adjusted so that the aggregate contributed resources remains substantially fixed.

Figure 10C:
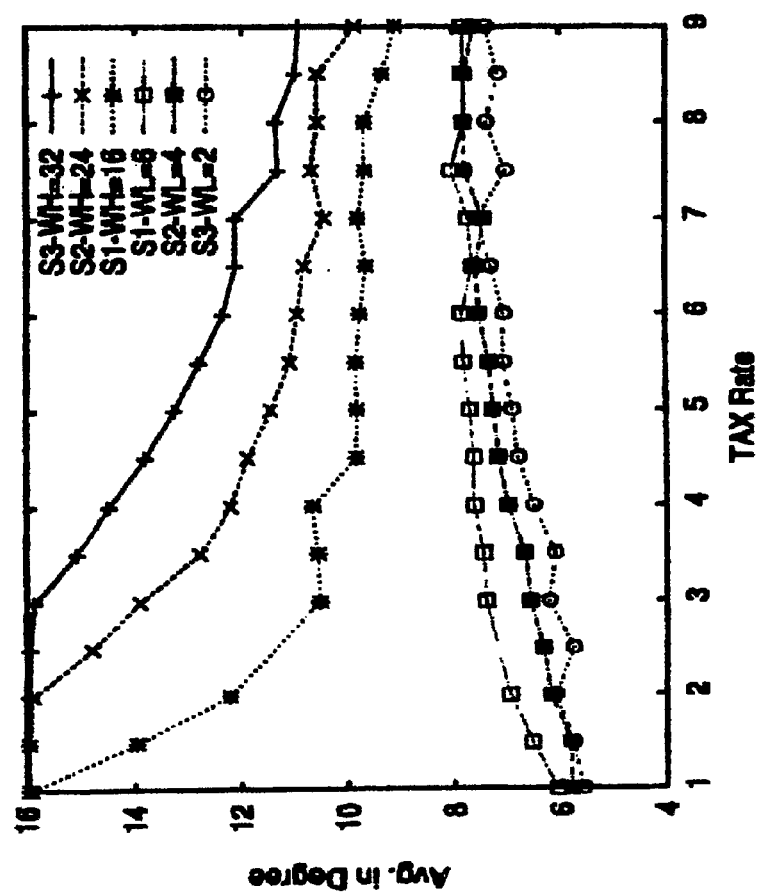
FIG. 10C is a graphical representation of in-degree weighted-average according to embodiments of the invention.

FIG. 10C presents the weighted average of total incoming degree (both entitled and excess) among high and low bandwidth peers in three scenarios. This figure shows that the average value of entitled and total degrees appear to be very similar. To further explore the dynamics of changes in entitled and excess degrees in each group of peers.

Figure 10D:
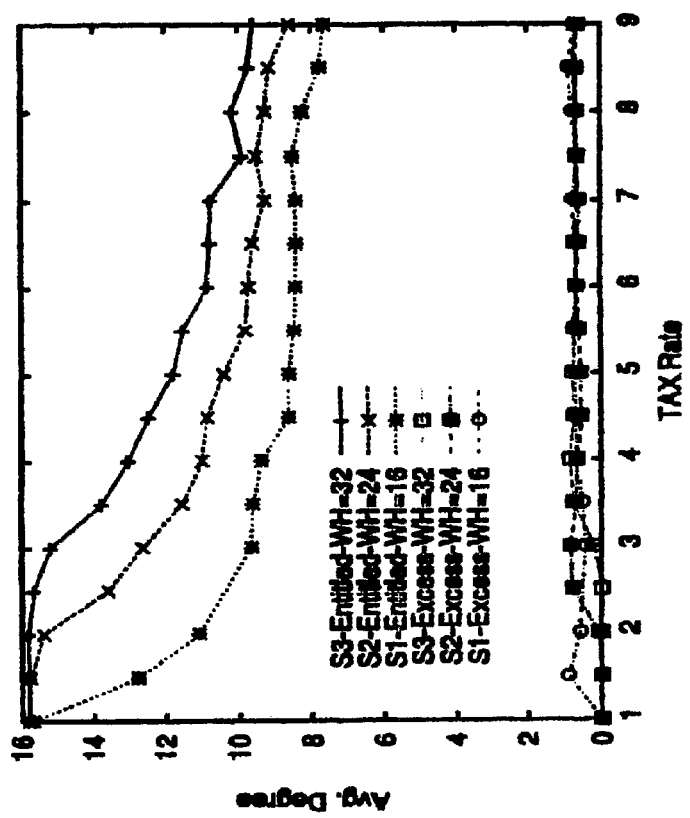
FIG. 10D is a graphical representation of average entitled and excess in degree high-bandwidth peers according to embodiments of the invention.
Figure 10E:
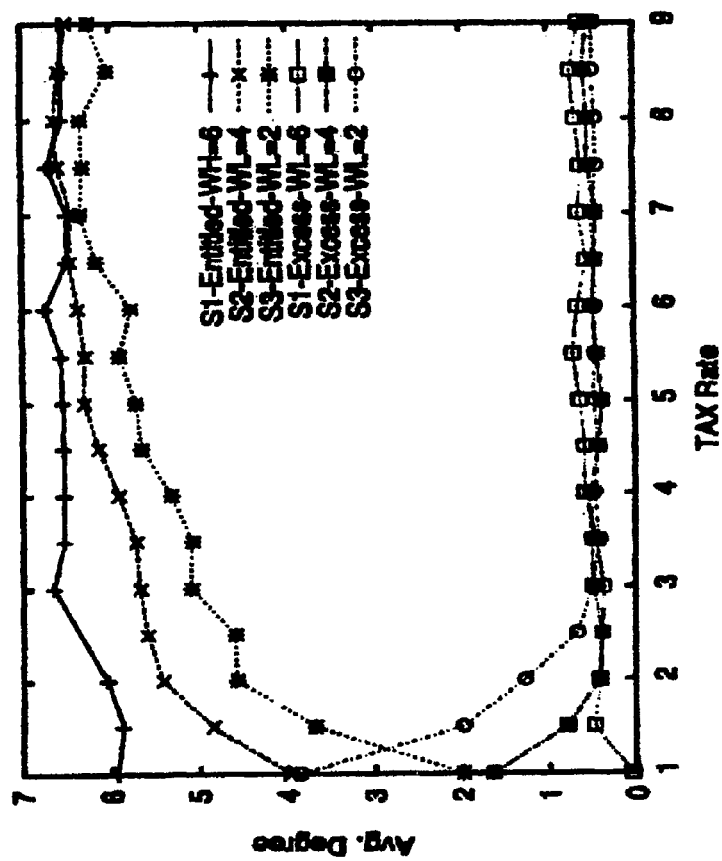
FIG. 10E is a graphical representation of average entitled and excess in-degree low bandwidth peers according to embodiments of the invention.

FIGS. 10D and 10E depict the weighted average value of both entitled and excess degree for high and low bandwidth peers, respectively. Examining the excess degree in these two figures illustrate the following points: First, for both high and low bandwidth peers, the weighted average excess degree does not change with the distribution of peer contributions (among scenarios) as long as high bandwidth peers are not saturated (i.e., t>3).

When high bandwidth peers are not saturated, the contribution aware mechanism effectively manages the available resources by controlling the entitled degree. Therefore, the only cause for excess resources is the rounding of the entitled degree (due to floor( )). This provides only a limited amount of excess resources, which explains the reason for having small excess degrees in this region (t>3) across all scenarios. Furthermore, these figures show that the contribution-aware mechanism can evenly distribute excess resources among all peers, since all peers have the same number of excess connections. Second, when the tax rate/cost factor is small, the entitled degree of the high bandwidth peers becomes saturated and thus they do not require excess connections. Since saturated peers do not use their entitled degree, excess resources become available in the system, and the amount of excess resources is proportional with ($WH_i$-Max). Low bandwidth peers can utilize these excess resources as excess connections as shown in FIG. 10E.

Figure 11A:
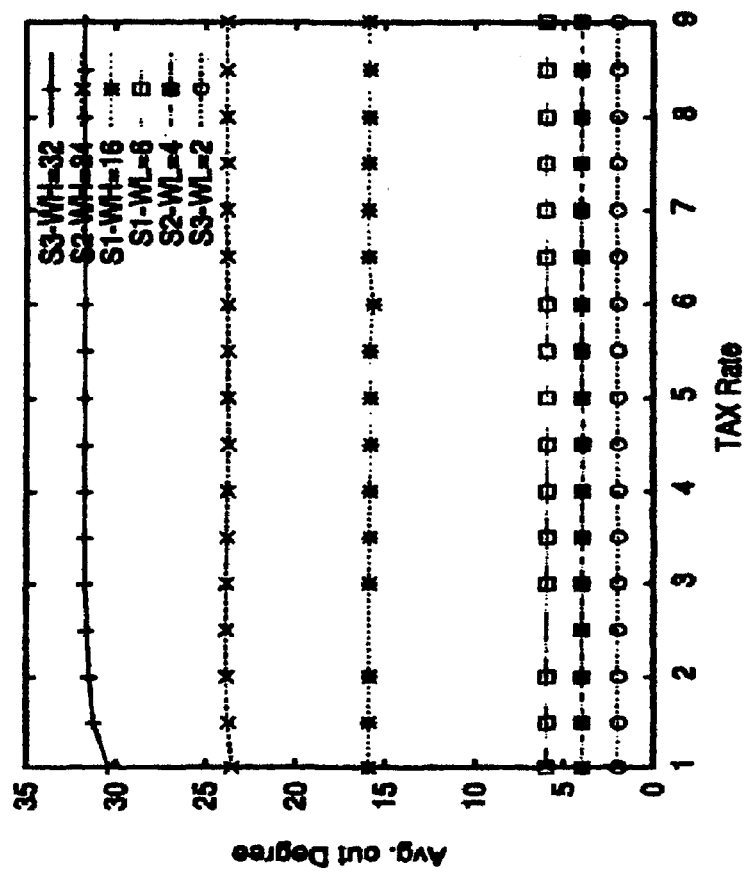
FIG. 11A is a graphical representation of weighted average out-degree according to embodiments of the invention.
Figure 11B:
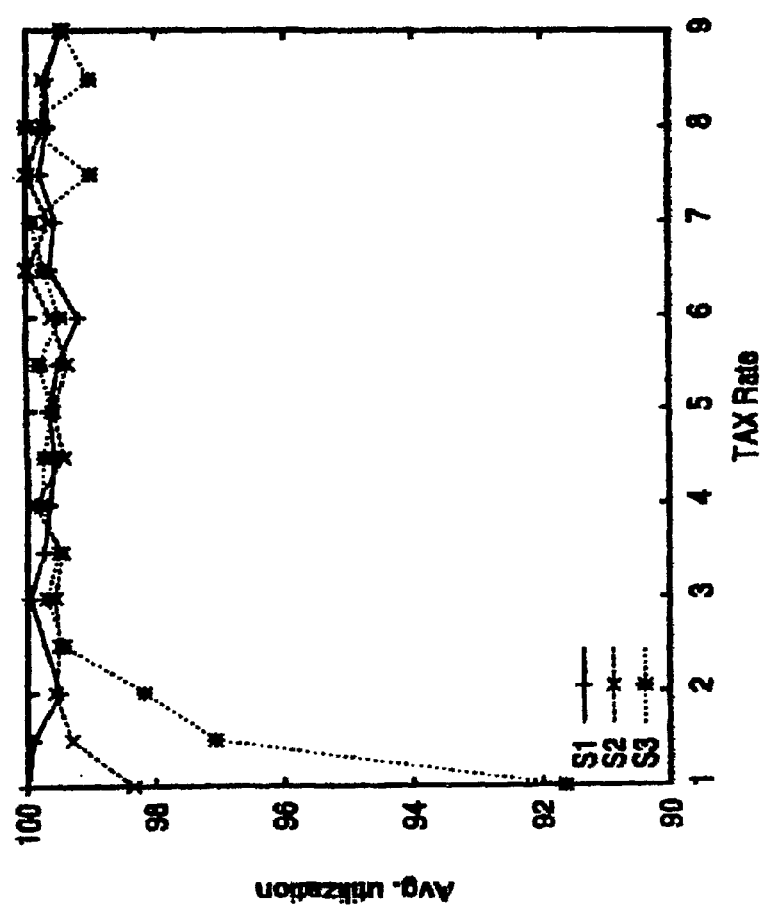
FIG. 11B is a graphical representation of average utilization according to embodiments of the invention.

FIG. 11A depicts system utilization for various the weighted embodiments having average outgoing degree among high and low bandwidth peers for three scenarios as a function of tax rate. This figure clearly shows that the outgoing degree of peers in all scenarios is very close to their willingness to contribute ($W_i$), i.e., the contribution-aware mechanism can effectively utilize available resources for different distribution of resources despite the dynamics in the connectivity among peers. FIG. 11B presents the overall utilization of system resources in a single snapshot of time, i.e., utilization of outgoing degree among all peers in one snapshot of the overlay. This figure shows that when high bandwidth peers are not saturated, resources are substantially perfectly utilized. In the saturated region, overall utilization of resources slightly drops due to the dynamics of excess connections. A relatively larger fraction of resources in the system is utilized by excess connections in the saturated region. As the fraction of excess connections increases, the exponential backoff in adapting the wait time for rejected excess connection could lead to unused resources and lower utilization. According to one embodiment of the invention as the fraction of excess resources increases, the probability increases that a request for an excess connection will be rejected. This reduces the utilization of resources due to back off in adapting the wait time for rejected excess connections.

TABLE 4

PARAMETERS USED IN SIMULATIONS TO EXAMINE THE EFFECT OF RI

| Resource Index | BW Distribution | BW | Contribution |
| --- | --- | --- | --- |
| 0.5 | 12%-88% | 1 Mbps-100 Kbps | 40-4 |
| 0.8 | 23%-77% | 1 Mbps-100 Kbps | 40-4 |
| 0.9 | 29%-71% | 1 Mbps-100 Kbps | 40-4 |
| 1 | 34%-66% | 1 Mbps-100 Kbps | 40-4 |

Figure 11C:
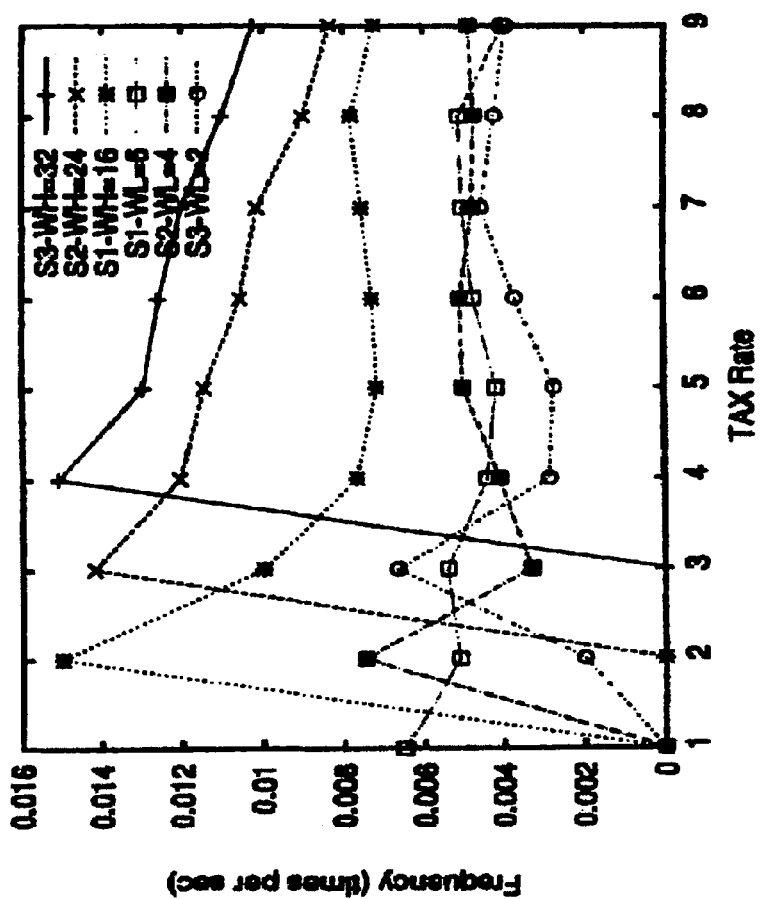
FIG. 11C is a graphical representation of rate of disconnection due to preemption according to embodiments of the invention.

FIG. 11C depicts the average rate of disconnections among high and low bandwidth peers due to preemption across all three scenarios as a function of tax rate/cost factor of 6. This figure quantifies the average level of dynamics in connectivity from parents that preemption causes for high or low bandwidth peers. High bandwidth peers do not experience any preemption while they are in the saturated regions (i.e., $WH_i$>Max) because they only establish entitled connections that cannot be preempted. Accordingly, in one embodiment of the invention high bandwidth peers do not experience any preemption because they only establish entitled connections that cannot be preempted.

However, outside the saturated region, high bandwidth peers experience a fair rate of disconnection among parents that gradually drops with increasing tax rate/cost factor. For low bandwidth peers, the observed rate of disconnection is small within the saturated region, since there is not much contention for resources and thus, there is no need for preemption. As the tax rate/cost factor increases, the average rate of disconnection remains constant across different scenarios. Moreover, while all participating peers have the same number of excess connections on average (outside of the saturated region, as shown in FIGS. 10D and 10E), FIG. 11C reveals that high bandwidth peers surprisingly observe a higher rate of disconnections. According to one embodiment of the invention, outside the saturated region, the average parent disconnection rate among low bandwidth peers is substantially insensitive to the cost factor/tax rate.

In one embodiment of the invention, a larger total peer degree results in a higher the parent disconnection rate. To explain the observed trend in the level of dynamics note that the type of individual connection (i.e., entitled vs. excess) is not explicitly specified by the contribution-aware mechanism in the mesh-based P2P streaming, as is shown herein. Since each parent peer only uses the number of excess and entitled connections for its current children (based on their last update) in order to make preemption decisions, it is likely that two parents leverage their last update from their common child and simultaneously preempt (i.e., disconnect) their connections to this child. The probability of such an event is proportional with the incoming degree of a child peer. Therefore, in general, outside of the saturated region, peers with higher number of incoming degree (high bandwidth peers) observe a higher frequency of preemption and this decreases by the tax rate/cost factor as their incoming degree decreases.

Next, how a change in RI affects the key performance metrics of various embodiments of the system is examined. The exemplary parameters used herewith are summarized in Table 4. It is assumed that Max=16, bwpf=25 Kbps and the group size is 500. Distribution of high and low bandwidth peers for each RI is derived from previous real world trace known in the prior art.

Figure 12A:
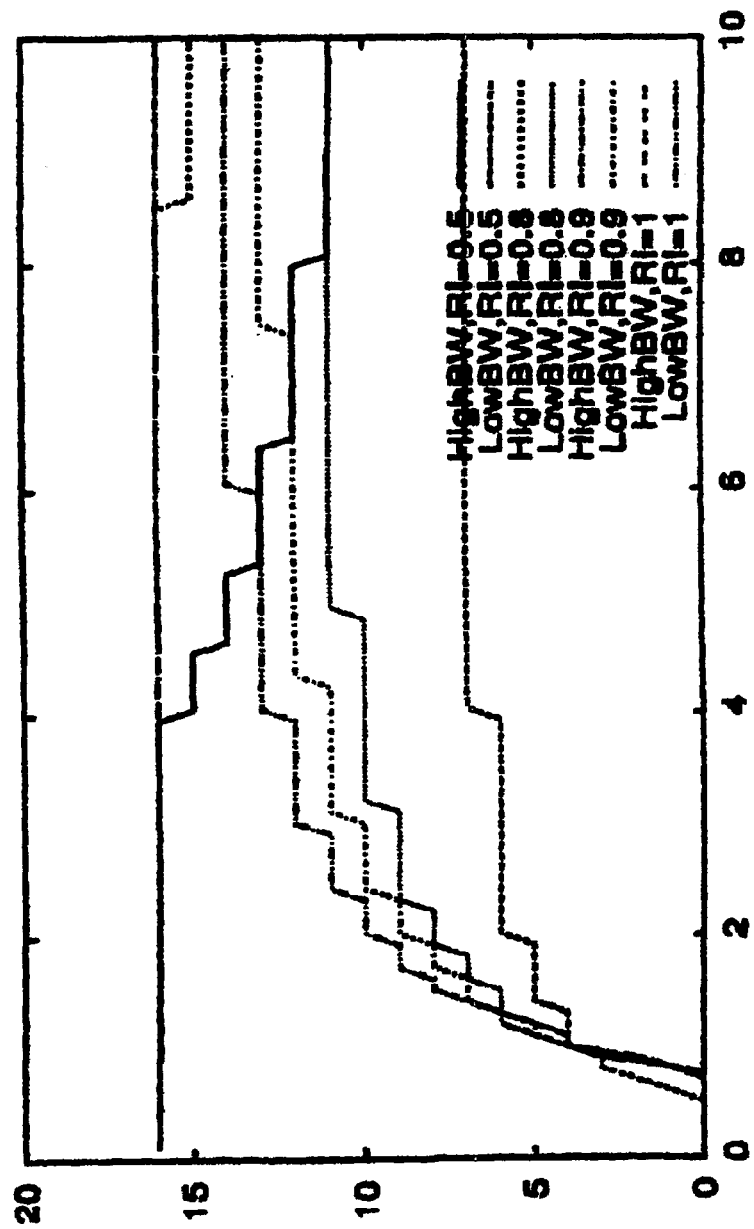
FIG. 12A is a graphical representation of computer entitled connections—rounded down according to embodiments of the invention.
Figure 12B:
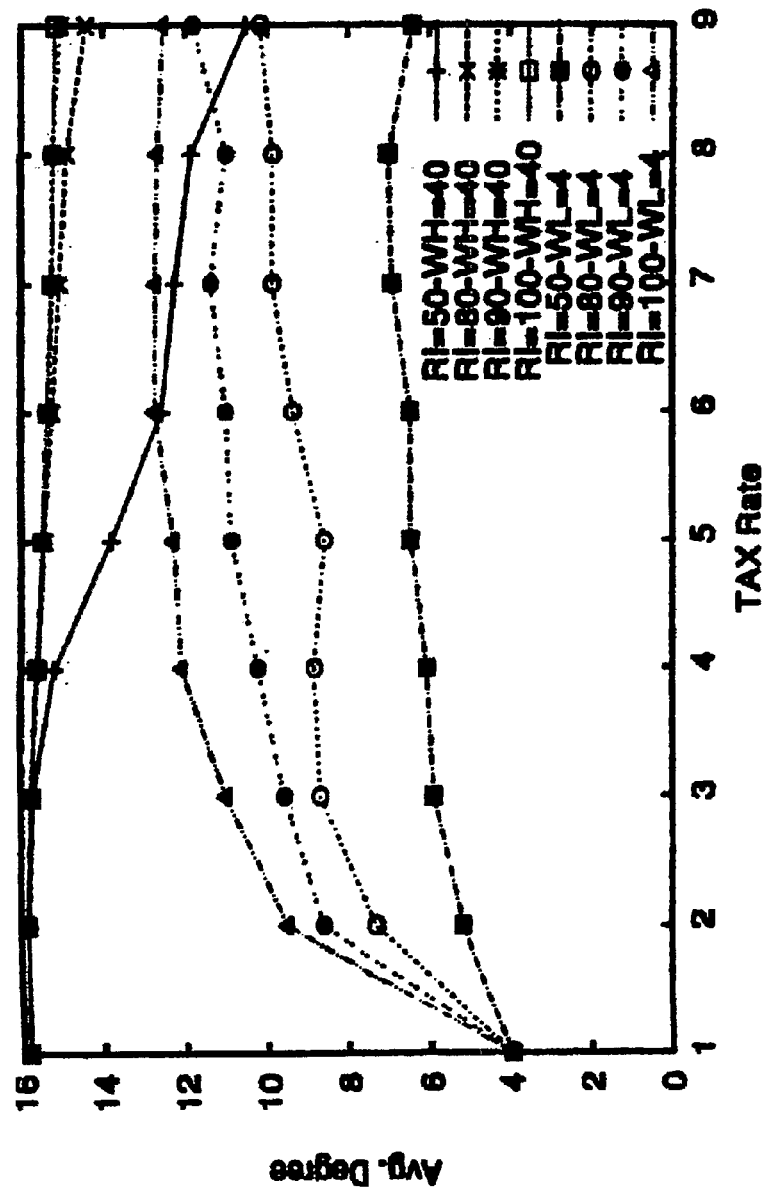
FIG. 12B is a graphical representation of entitled weighted-average, taken with respect to tax rate/cost factor according to embodiments of the invention.

FIG. 12A shows the entitled degree of high and low bandwidth peers with different RI computed based on equation (2) as a reference. FIG. 12B depicts the weighted average entitled degree of high and low bandwidth peers in scenarios with different RI as a function of tax rate/cost factor. Comparing these two figures reveals that the weighted average entitled degree of high and low bandwidth peers follows their corresponding value derived from equation (2). In one embodiment, the frequency of disconnection is the inverse value of average time between consecutive preemptions observed by a single peer, which is then averaged across all peers. As FIGS. 12A and 12B show high bandwidth peers entitled degree in scenarios with RI>0:8 is saturated in the tax rate/cost factor range of up to 9. This shows that the saturated region for high bandwidth peers expands, which affects other metrics.

Figure 12C:
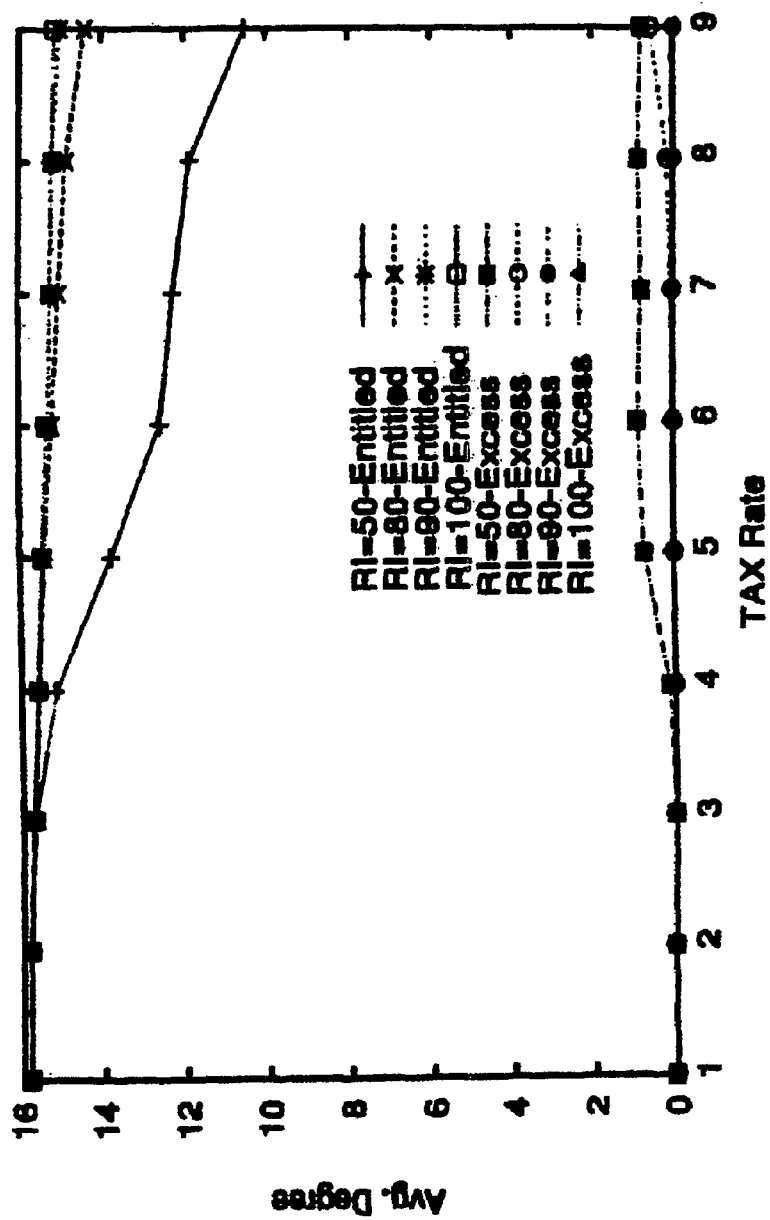
FIG. 12C is a graphical representation of average entitled and excess in-degree high-bandwidth peers according to embodiments of the invention.
Figure 12D:
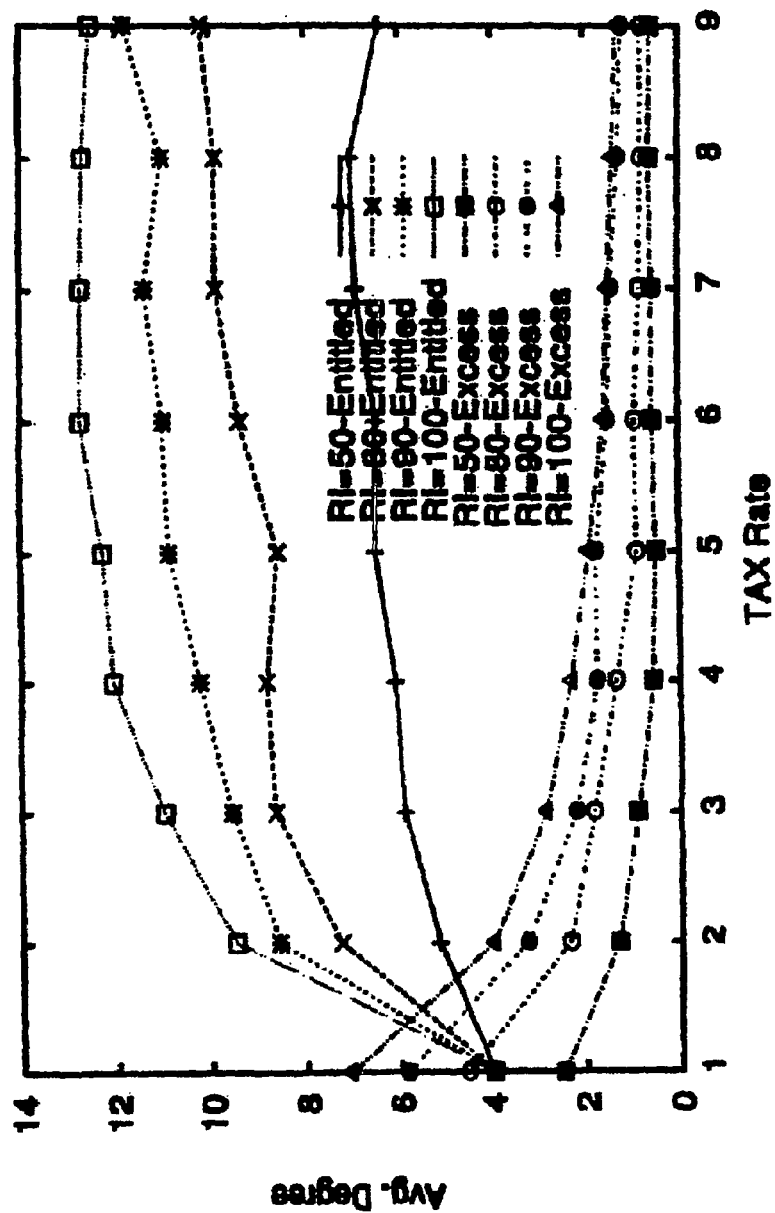
FIG. 12D is a graphical representation of average entitled and excess in-degree low bandwidth peers according to embodiments of the invention.

FIGS. 12C and 12D show the average entitled and excess degree of high and low bandwidth peers respectively. As shown in FIG. 12C high bandwidth peers do not have any excess connection in the tax rate/cost factor range of up to 9 due to the expansion of the saturated region in higher resource index scenarios. On the other hand, FIG. 12D reveals that low bandwidth peers get more excess connections to compensate for the saturation and utilize available resources.

Figure 12E:
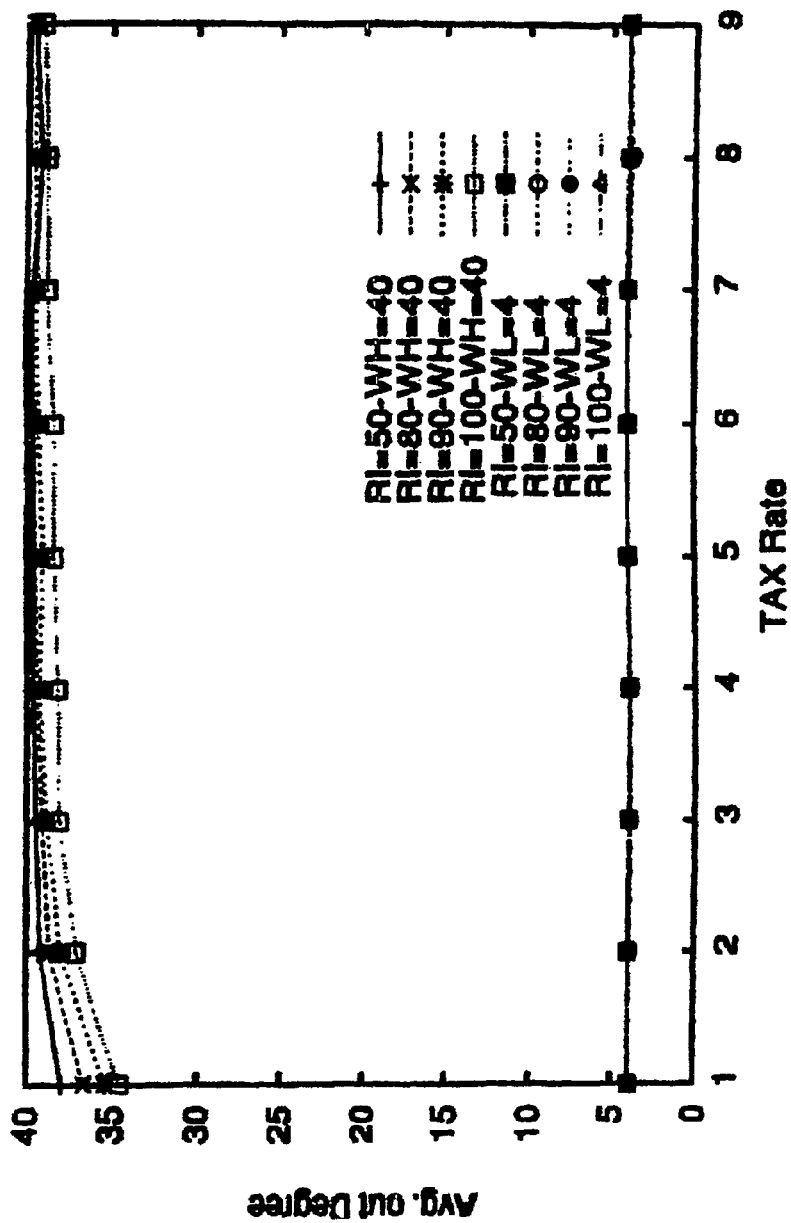
FIG. 12E is a graphical representation of weighted-average out-degree according to embodiments of the invention.

FIG. 12E shows the average outgoing-degree of high and low bandwidth peers in scenarios with different RI as a function of tax rate/cost factor. This figure clearly shows that despite the tax rate/cost factor and RI the average outgoing degree of high and low bandwidth peers is close to their contribution. There is a slight decrease in average outgoing degree of high bandwidth peers with a smaller tax rate/cost factor.

Figure 12F:
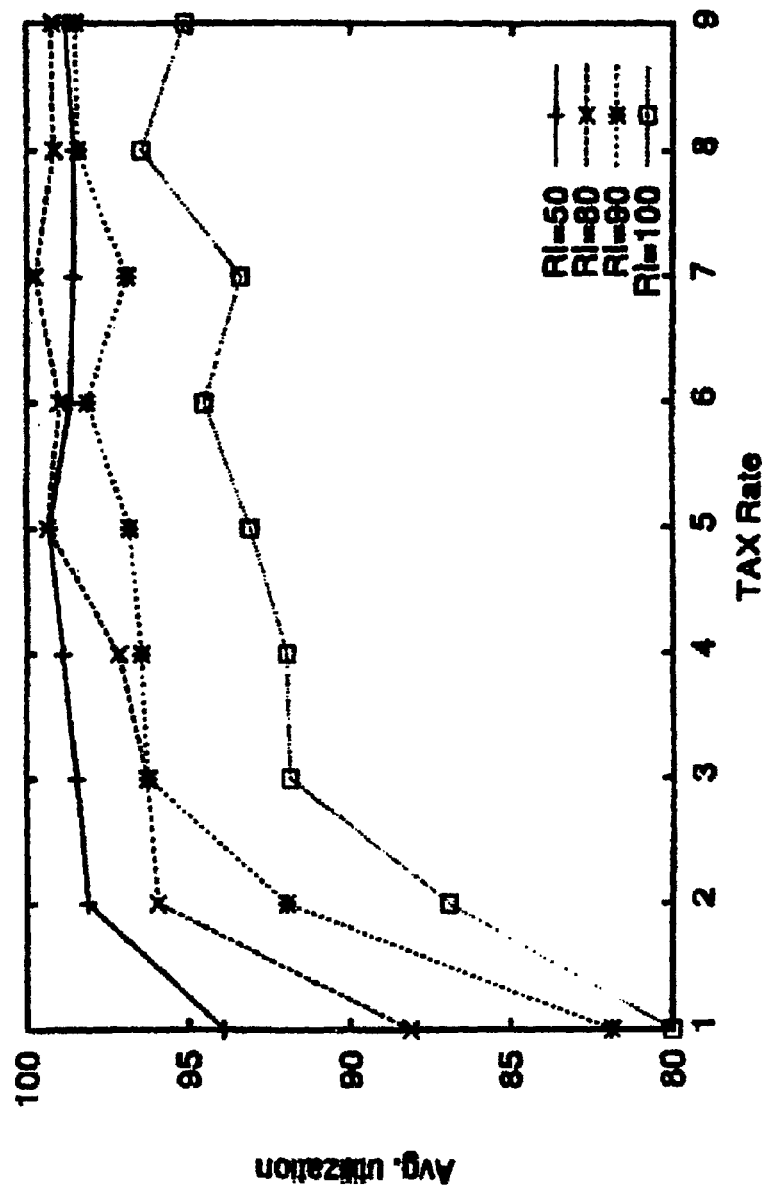
FIG. 12F is a graphical representation of average utilization according to embodiments of the invention.

FIG. 12F shows the utilization of resources in a snapshot. This figure also reveals that in the saturated region the overall utilization of the resources decreases. As mentioned above, in scenarios with RI>0:8 high bandwidth peers are in their saturated region, therefore, there are plenty of excess connections for low bandwidth peers (shown in FIG. 12D).

Simulations of various embodiments reveal the effects of a lower tax rate/cost factor. Exponential backoff in adapting the wait time for rejected excess connection could lead to low utilization of available resources.

The effects of scalable the contribution-aware mechanism are examined as follows. The population is changed from 100 peers to 1000 peers and the results of different performance metrics are examined. It is assumed that RI=0.5, Max=16 and bwpf=50 Kbps. High bandwidth peers contribute up to 24 connections and low bandwidth peers contribute up to 4 connections.

Figure 13A:
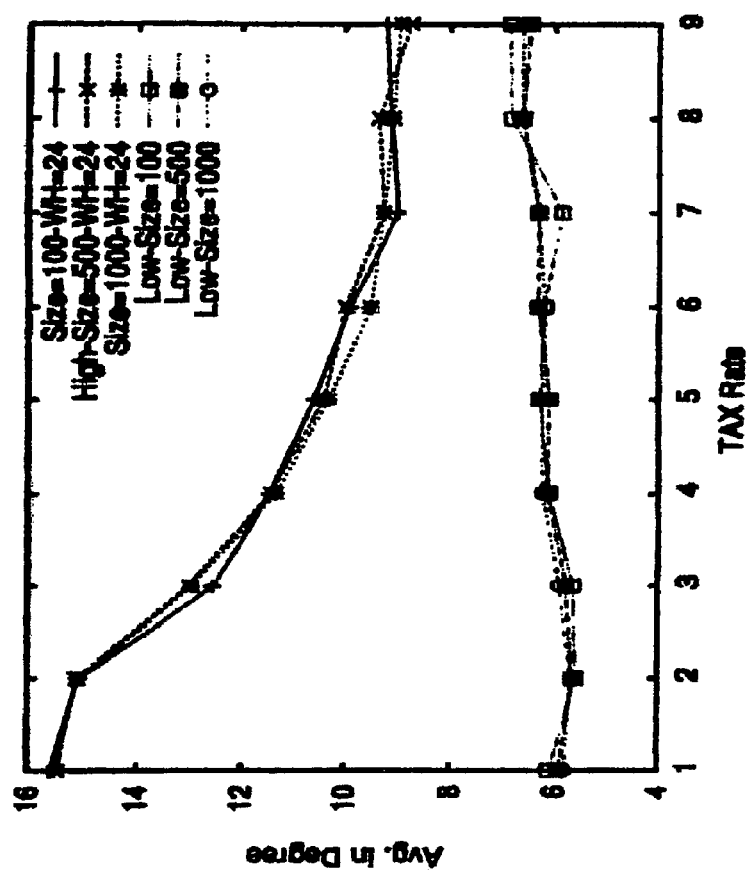
FIG. 13A is a graphical representation of weighted-average in-degree according to embodiments of the invention.
Figure 13B:
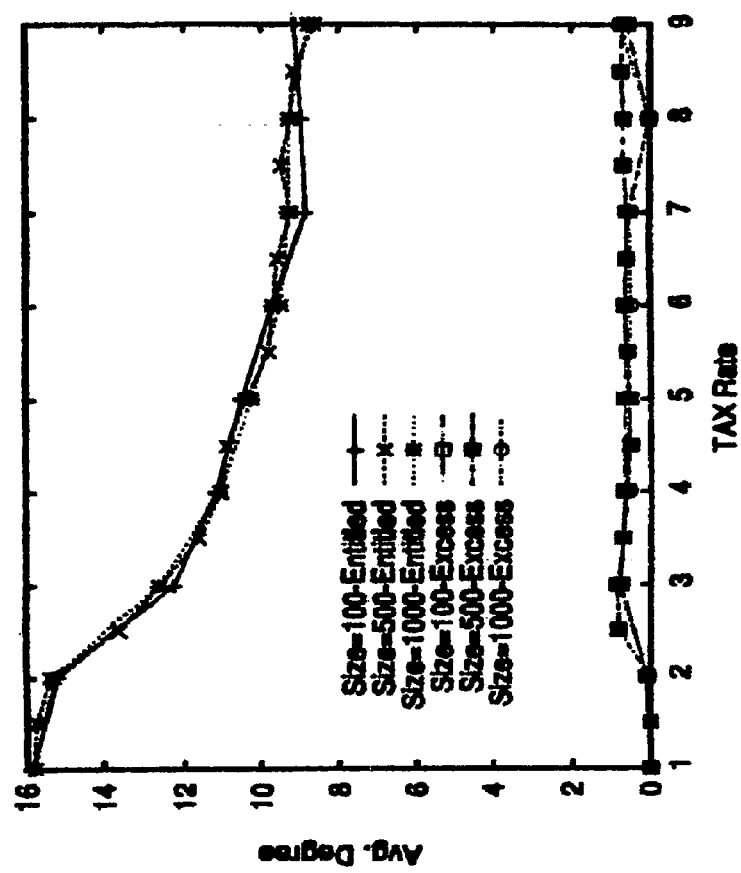
FIG. 13B is a graphical representation of average entitled and excess in-degree high-bandwidth peers according to embodiments of the invention.
Figure 13C:
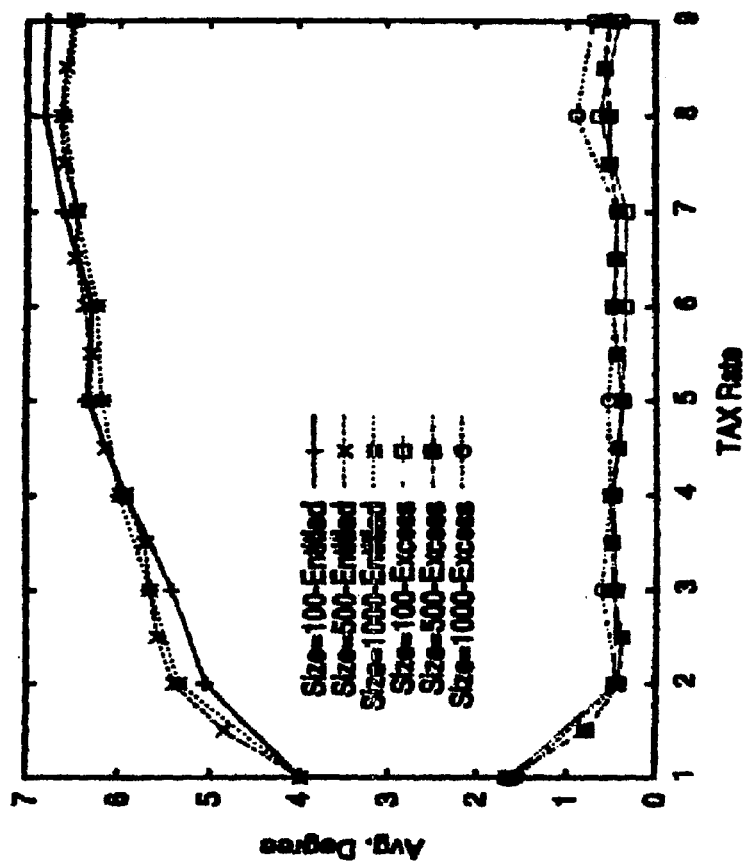
FIG. 13C is a graphical representation of average entitled and excess in-degree low bandwidth peers according to embodiments of the invention.

FIG. 13A depicts the weighted average incoming-degree of high and low bandwidth peers in scenarios with different group sizes as a function of the tax rate/cost factor. This figure clearly shows that regardless of group size, the contribution-aware mechanism works properly. FIGS. 13B and 13C show the average entitled and excess degree of high and low bandwidth peers respectively. These figures reveal that the average entitled and excess degree of low and high bandwidth peers are close for different group sizes. One of ordinary skill in the art will see, that the contribution-aware mechanism is scalable and works in scenarios with different group sizes.

The effect of update interval on the overall performance is as follows. The update interval is varied from 10 sec up to 120 sec according to respective embodiments of the invention. In all simulations RI=0:5, Max=16 and bwpf=50 Kbps. The degree of high bandwidth peers is 24 and that of low bandwidth peers is 4.

Figure 14A:
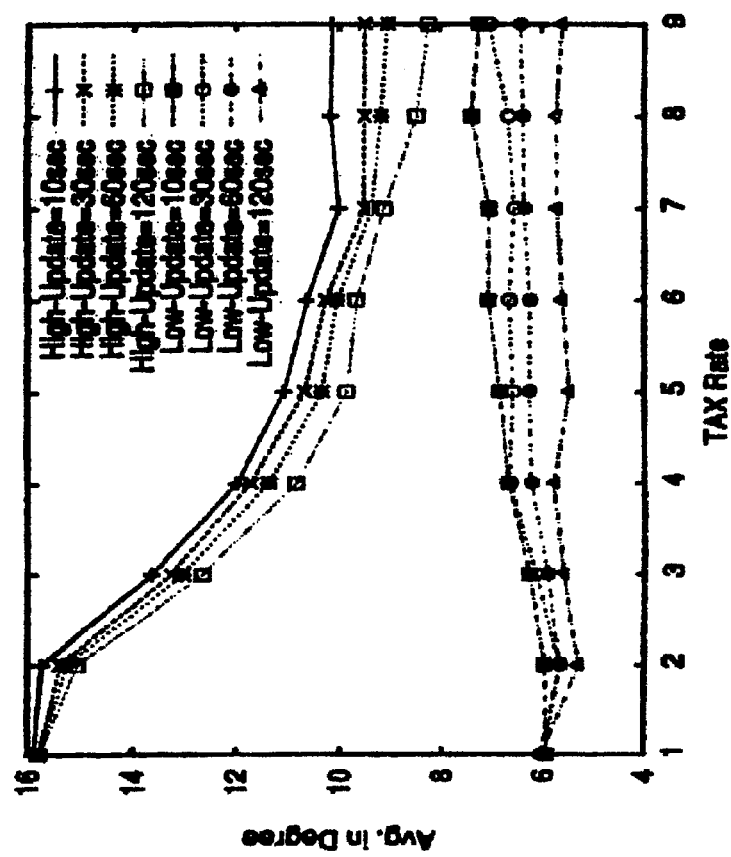
FIG. 14A is a graphical representation of weighted average in-degree according to embodiments of the invention.

FIG. 14A shows the average incoming-degree of high and low bandwidth peers in scenarios with different update intervals as a function of the tax rate/cost factor. Clearly, this figure shows that the average degree of peers follows the same trend regardless of the period of updates. FIG. 14A reveals that by increasing the period of updates the average incoming-degree of peers decreases up to 20%.

Figure 14B:
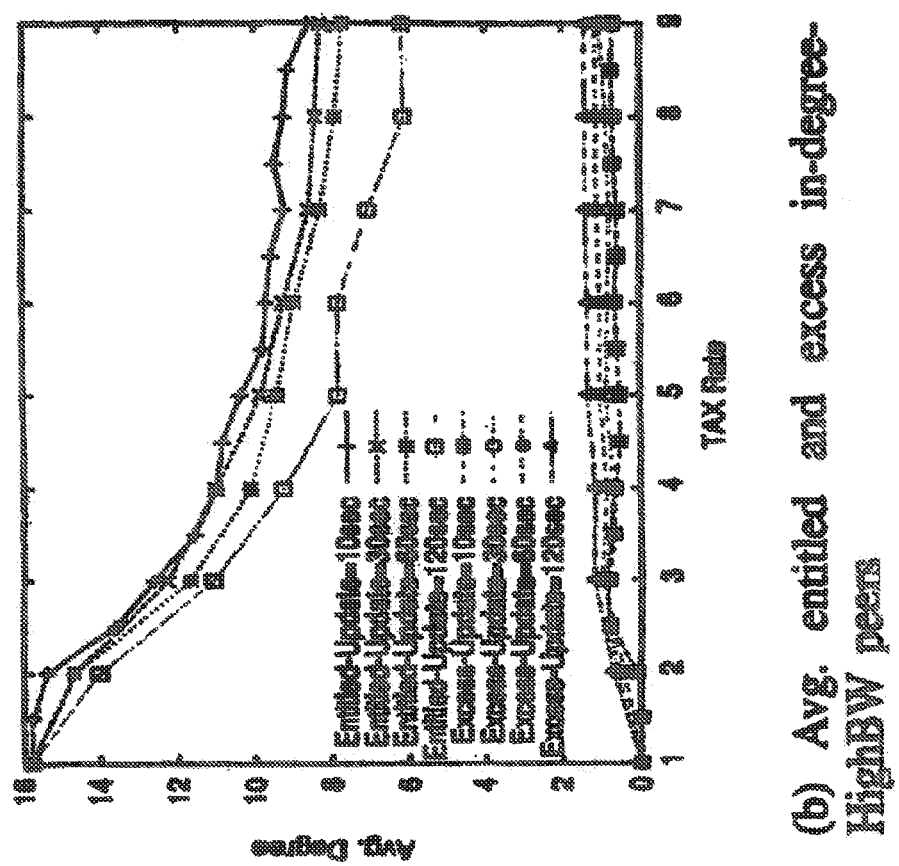
FIG. 14B is a graphical representation of average entitled and excess in-degree high-bandwidth peers according to embodiments of the invention.
Figure 14C:
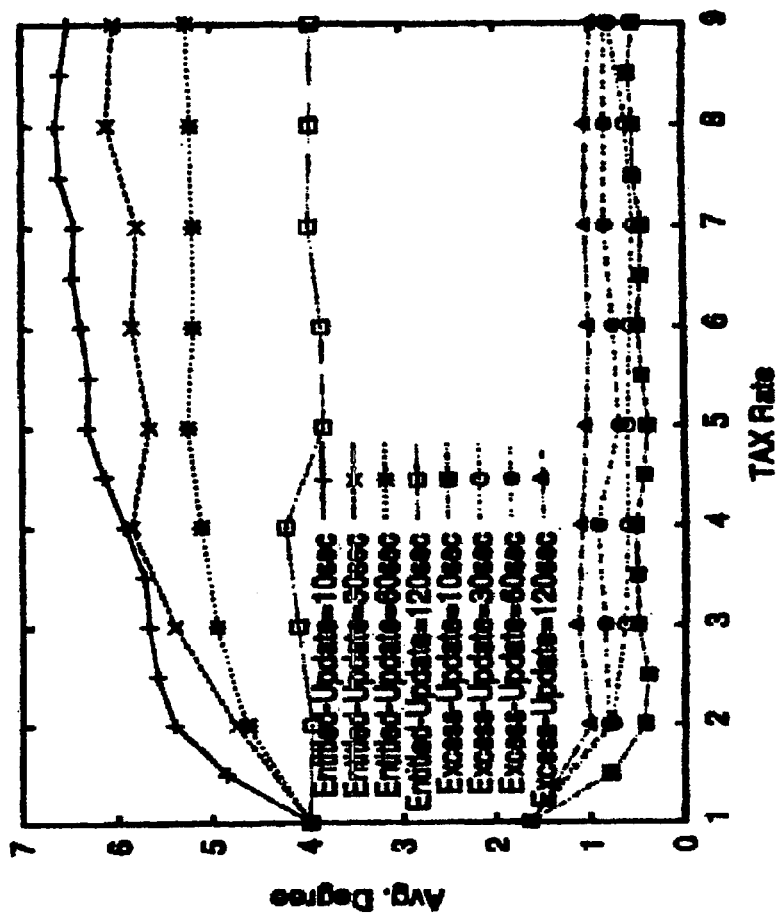
FIG. 14C is a graphical representation of average entitled and excess in-degree low bandwidth peers according to embodiments of the invention.

FIGS. 14B and 14C show the separation of the incoming-degree of high and low bandwidth peers into their entitled and excess connections, respectively. Interestingly, these figures reveal that by increasing the period of updates, the average entitled connections decrease significantly. On the other hand, the average excess connections slightly increase by increasing the period of updates.

By increasing the period of updates, two major issues might arise, which are the result of longer propagation or collection of the system-wide information.
  (i) Due to the increase in the period of the collection of the per peer information, the bootstrap node/peer may not have a correct view of the whole overlay and its stored information might be obsolete. As a result, the bootstrap node/peer might mistakenly assume a peer has an empty slot to accept new child peer or has an excess connection to be preempted and replaced by another entitled peer. In both cases, the information that the bootstrap node/peer sends to the new peer is incorrect.
  (ii) Due to the longer period of propagating the information from the bootstrap node/peer to the individual peer, a transient change in the total resources $$\left( \sum_{i=1}^{N} W_i / N \right)$$

might mistakenly affect the computed entitled connections for each peer by equation (2). Therefore, a transient change would affect peers for a longer time and might reduce their ability to get their fair share of entitled connections.

More specifically, with fewer entitled connections a peer tries to establish more excess connections (as shown in FIG. 14B by an increase in the average excess connections). Note that a peer looking for an excess connection cannot preempt other excess connections, which results in a lower total incoming-degree. Surprisingly, both of the above mentioned issues affect primarily the performance of short-lived peer embodiment.

Figure 14D:
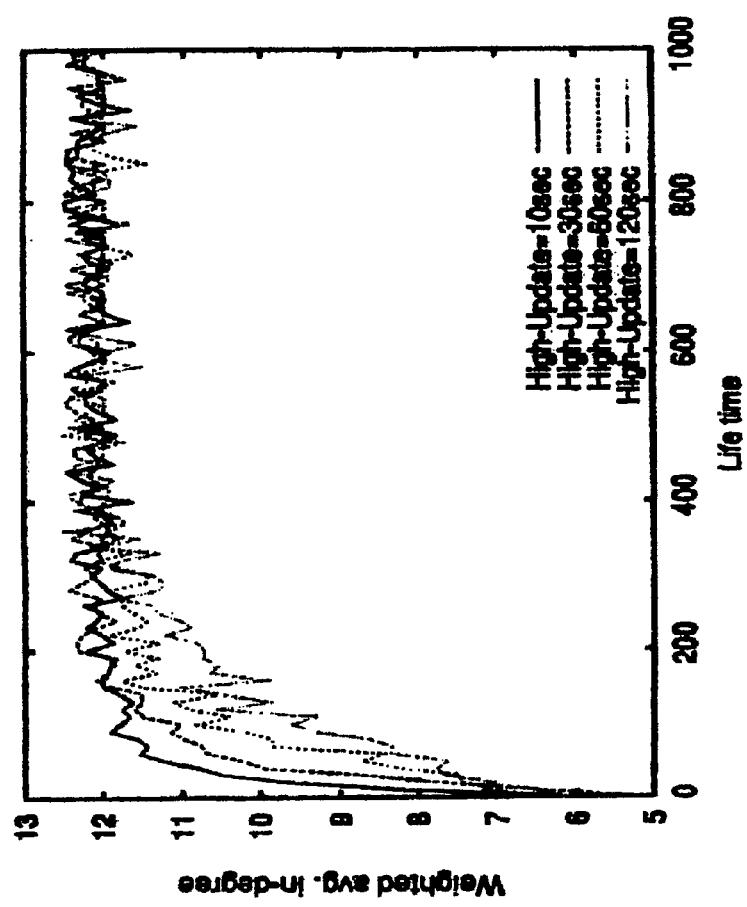
FIG. 14D is a graphical representation of average in-degree for high-bandwidth peers with differing lifetimes according to embodiments of the invention.
Figure 14E:
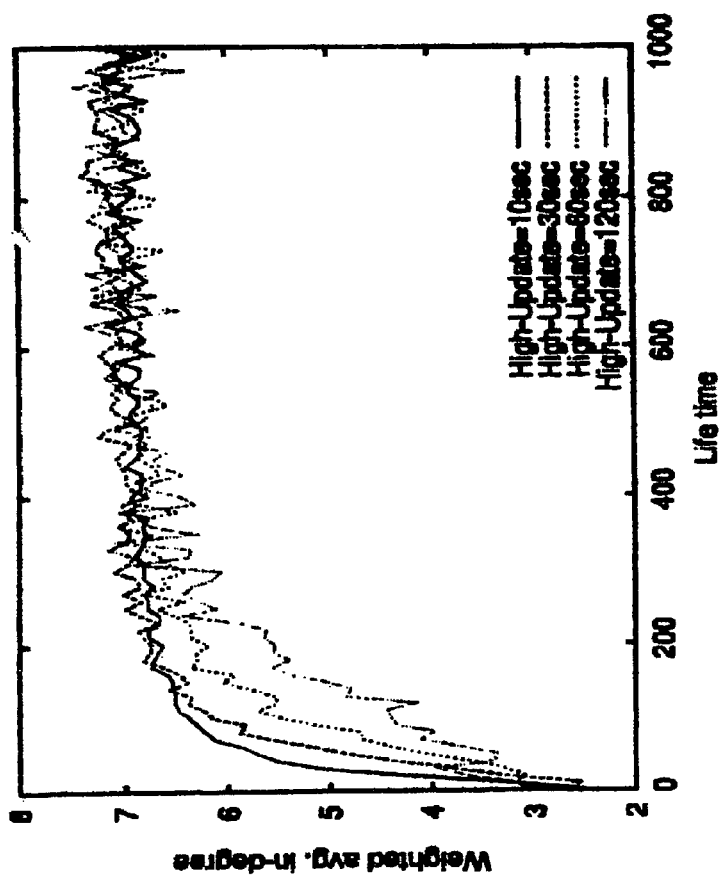
FIG. 14E is a graphical representation of average in-degree for low bandwidth peers with differing lifetimes according to embodiments of the invention.

FIGS. 14D and 14E shows the weighted average incoming-degree of high and low bandwidth peers as a function of their life time, respectively. The x-axis is truncated at 1000 seconds, since beyond that there is no change in peers' incoming-degree. The chosen tax rate/cost factor is 4 in these figures and there is no major difference between other tax rates/cost factors for this particular result. These figures show two major points:
  (i) the average incoming-degree of long-lived peers does not change with different updates periods, and
  (ii) short-lived peers have lower incoming-degree with a larger update period.

Figure 14F:
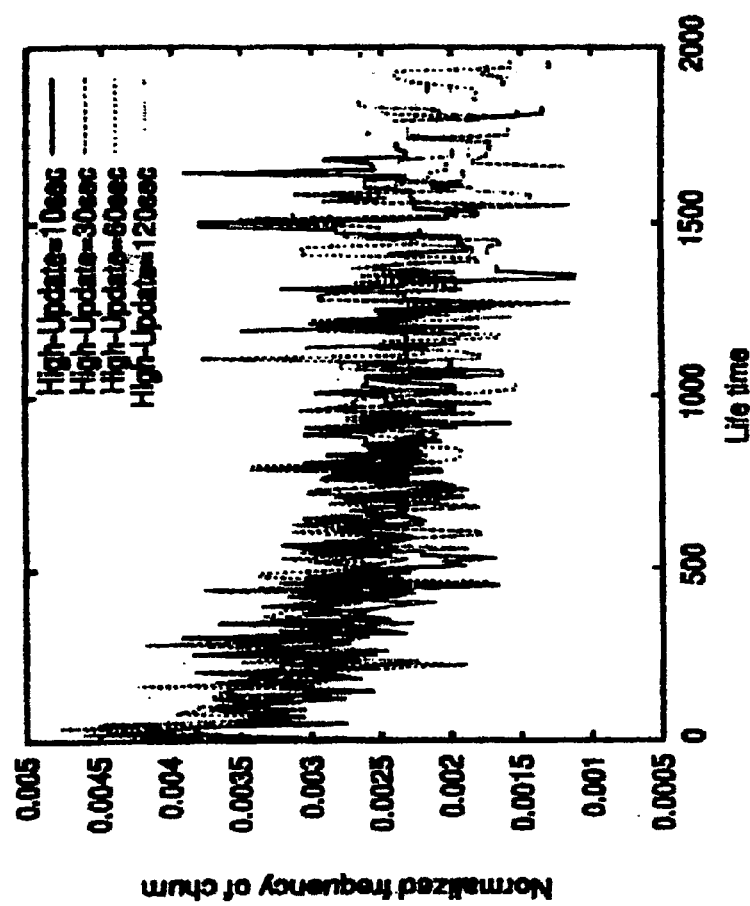
FIG. 14F is a graphical representation of normalized frequency of churn for peers with differing lifetimes according to embodiments of the invention.

In explanation of this phenomenon, FIG. 14F shows the normalized frequency of churn for all peers across different life times. Clearly, this figure shows that peers with a longer life time observe less churn. Accordingly, it is apparent that long-lived peers tend to eventually connect to each other. Therefore, long-lived peers lose their parents due to churn less often, which means that the obsolete information from a bootstrap node would tend not to affect their connectivity drastically. On the other hand, the transient change in resources will not affect long-lived peers significantly as they stay in the system long enough to cancel out the adverse effect of incorrect computations of entitled connections.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method of admitting a joining contribution-aware peer to a peer-to-peer live streaming network comprising:
receiving, by said joining contribution aware peer, a plurality of system parameters at said joining peer, said plurality of system parameters including a system resource index from a bootstrap node;
calculating, by said joining contribution aware peer, an entitled incoming degree value for said joining peer, said calculated entitled incoming degree reflecting a value of said system resource index and said joining peer's willingness to contribute bandwidth to server other peers in said live streaming peer-to-peer network;
receiving a list of potential parent peers at said contribution aware joining peer from said bootstrap node; and
establishing communications, by said joining contribution aware peer, with at least one of said potential parent peers on said received list of potential parent peers in order to receive live streaming content.

2. The method for admitting a joining contribution-aware peer to a said live streaming peer-to-peer network as defined in claim 1, wherein said system resource index being adapted to provide a resource floor within said live streaming peer-to-peer network, and further wherein said system resource index is calculated according to equation $$RI = \frac{\sum W_i}{N * \text{Max}},$$

where Max is a number of connections required in order to receive a full quality live streaming, N is a number of participating peers and $W_i$ is a willingness of peer i to participate.

3. The method for admitting a joining contribution-aware peer to a said live streaming peer-to-peer network as defined in claim 2, wherein calculating said entitled incoming degree value for said joining peer is performed according to equation $$R_i = \left[ \min \left\{ \frac{1}{t} W_i + \frac{t-1}{t} \sum_{i=0}^{N} \frac{W_i}{N}, \text{Max} \right\} \right],$$

where t is a cost factor.

4. The method for admitting a joining contribution-aware peer to a said live streaming peer-to-peer network as defined in claim 1, further comprising calculating said entitled incoming degree value using a processing device of said joining peer.

5. The method for admitting a joining contribution-aware peer to a said live streaming peer-to-peer network as defined in claim 1, further comprising receiving willingness information from a peer device of said live streaming peer-to-peer network on a periodic basis.

6. The method of admitting a joining contribution-aware peer to said live streaming peer-to-peer network as defined in claim 1, further comprising sending a heartbeat message to a peer device of said live streaming peer-to-peer network on a periodic basis.

7. The method of admitting a joining contribution-aware peer to said live streaming peer-to-peer network as defined in claim 1, wherein said joining peer is adapted to transmit a signal having a bandwidth parameter, said bandwidth parameter being related to a willingness of said joining peer to contribute a resource to said live steaming peer-to-peer network.

8. The method of admitting a joining contribution-aware peer to a said live streaming peer-to-peer network as defined in claim 1, wherein said joining peer is adapted to receive a signal, said signal being configured as a multiple description coding signal.

* * * * *